US009990486B2

(12) United States Patent
Taniguchi

(10) Patent No.: US 9,990,486 B2
(45) Date of Patent: Jun. 5, 2018

(54) IC CARD, IC MODULE, AND IC CARD SYSTEM

(71) Applicant: Kabushiki Kaisha Toshiba, Minato-ku (JP)

(72) Inventor: Keita Taniguchi, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days. days.

(21) Appl. No.: 15/505,801

(22) PCT Filed: Aug. 12, 2015

(86) PCT No.: PCT/JP2015/004033
§ 371 (c)(1),
(2) Date: Feb. 22, 2017

(87) PCT Pub. No.: WO2016/027441
PCT Pub. Date: Feb. 25, 2016

(65) Prior Publication Data
US 2017/0277879 A1 Sep. 28, 2017

(30) Foreign Application Priority Data
Aug. 22, 2014 (JP) .................................. 2014-169419

(51) Int. Cl.
*G06F 21/34* (2013.01)
*G06K 19/073* (2006.01)
(Continued)

(52) U.S. Cl.
CPC ............. *G06F 21/34* (2013.01); *G06K 19/06* (2013.01); *G06K 19/073* (2013.01); *G06K 19/0723* (2013.01)

(58) Field of Classification Search
CPC ...... G06F 21/34; G60K 19/06; G60K 19/073; G60K 19/0723
See application file for complete search history.

(56) References Cited

U.S. PATENT DOCUMENTS

2004/0249503 A1 12/2004 Sanchez
2007/0250923 A1 10/2007 M'Raihi
2014/0189359 A1 7/2014 Marien et al.

FOREIGN PATENT DOCUMENTS

JP 2003-91712 A 3/2003
JP 2005-78165 A 3/2005
(Continued)

OTHER PUBLICATIONS

Combined Singaporean Search Report and Written Opinion dated Aug. 1, 2017 in Singaporean Patent Application No. 11201701410Q.

(Continued)

*Primary Examiner* — Kristy A Haupt
(74) *Attorney, Agent, or Firm* — Oblon, McClelland, Maier & Neustadt, L.L.P.

(57) ABSTRACT

Provided are an IC card, an IC module and an IC card system that can improve the security. An IC card of embodiments has a generation unit and an authentication unit. The generation unit generates a second password that is a password for authenticating a card user based on a first password stored in a storage unit in advance, a predetermined parameter and a predetermined algorithm. The authentication unit compares a third password acquired from an external apparatus and provide second password, and determines the validity of the card user based on the comparison result.

13 Claims, 16 Drawing Sheets

(51) Int. Cl.
*G06K 19/06* (2006.01)
*G06K 19/07* (2006.01)

(56) References Cited

FOREIGN PATENT DOCUMENTS

| JP | 2005-85071 A | 3/2005 |
| JP | 2006-268779 A | 10/2006 |
| KR | 2002-0010252 A | 2/2002 |

OTHER PUBLICATIONS

International Search Report dated Nov. 2, 2015 in PCT/JP2015/004033 filed Aug. 12, 2015.
European Office Action dated Jan. 1, 2018 in European Application No. 15833699.0 (7 pages).

| CARD ID | PIN INITIAL VALUE | PIN | PAR | ... |
|---|---|---|---|---|
| XXXXX | 0015 | 0020 | 0005 | ... |
| ⋮ | ⋮ | ⋮ | ⋮ | ⋮ |

IC CARD, IC MODULE, AND IC CARD SYSTEM

CROSS-REFERENCE TO RELATED APPLICATION

This application is based upon and claims the benefit of priority from Japanese Patent Application No. 2014-169419, filed on Aug. 22, 2014; the entire contents of which are incorporated herein by reference.

TECHNICAL FIELD

Embodiments described herein relate to an IC card, an IC module and an IC card system.

BACKGROUND ART

In recent years, IC cards having a built-in IC chip are widely used. A conventional IC card receives a secret password shared with a card holder who is a valid card owner, and compares the received password and a password stored in the IC card, thereby authenticating the validity of the card holder. However, such a conventional IC card uses static data (a fixed value) as a password, and thus, for example, if the password is leaked, there was a possibility that a third party poses as a card holder and fraudulently uses the IC card.

The following document relates to the above-described technique, the entire contents of which are incorporated herein by reference.

Patent Document 1: Japanese Patent Laid-Open No. 2006-268779

SUMMARY OF INVENTION

Technical Problem

The problem to be solved by the invention is to provide an IC card, an IC module and an IC card system that can improve the security.

Solution to Problem

An IC card of an embodiment has a generation unit and an authentication unit. The generation unit generates a second password, which is a password for authenticating a card user, based on a first password stored in a storage unit in advance, a predetermined parameter and a predetermined algorithm. The authentication unit compares a third password acquired from an external apparatus and the second password, and determines the validity of the card user based on the comparison result.

DESCRIPTION OF EMBODIMENTS

An IC card, an IC module, and an IC card system of embodiments will be described below with reference to the drawings.

First Embodiment

Figure 1:
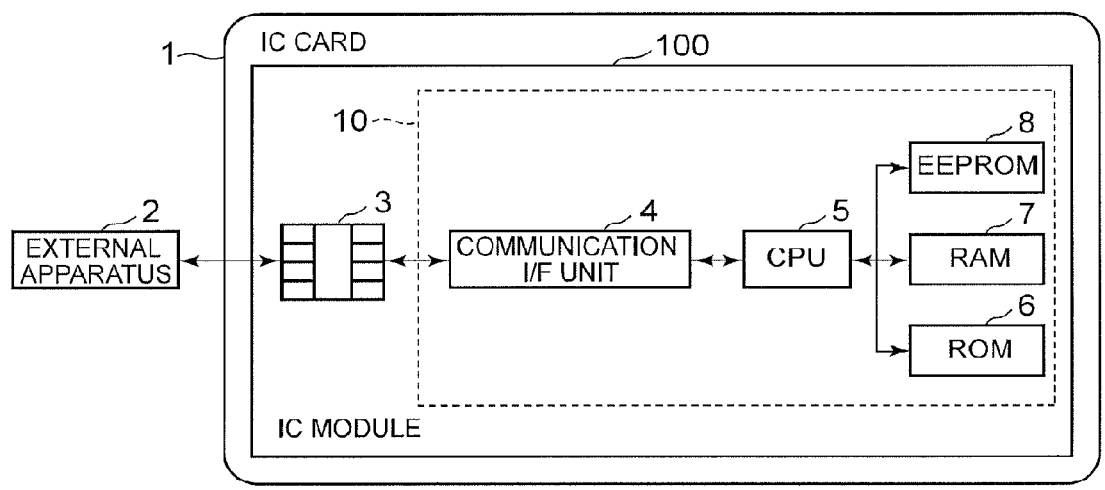
FIG. 1 is a diagram showing an example of the hardware configuration of an IC card of a first embodiment.

FIG. 1 is a diagram showing an example of the hardware configuration of an IC card 1 of a first embodiment. As shown in this FIG. 1, the IC card 1 is provided with an IC module 100, and the IC module 100 is provided with a contact portion 3 and an IC chip 10. The IC card 1 is formed by implementing the IC module 100 on a plastic card base material, for example. Also, the IC card 1 can communicate with an external apparatus 2 via the contact portion 3. For example, the IC card 1 receives, via the contact portion 3, a command (processing request) transmitted by the external apparatus 2, and executes processing (command processing) that is based on the received command. The IC card 1 then transmits a response (processing response) that is a result of executing the command processing, to the external apparatus 2 via the contact portion 3.

Note that, for example, the IC card 1 according to this embodiment dynamically changes a password for authenticating a card holder who is the owner of the IC card 1 in accordance with a predetermined algorithm shared by the IC card 1 and the card holder, and determines the validity of the card holder. In this embodiment, an example will be described in which processing for adding a predetermined parameter is used as the predetermined algorithm. In addition, the example shown in FIG. 1 represents a configuration example for a case where the IC card 1 is connected to the external apparatus 2, and off-line processing is performed, for example.

The external apparatus 2 is a host apparatus that performs communication with the IC card 1, and, for example, is a terminal apparatus including a reader/writer apparatus and the like. Moreover, the external apparatus 2 outputs a command to the IC card 1 such that command processing is executed. For example, the external apparatus 2 receives a password (e.g., PIN (Personal Identification Number)) from a card holder (card user) who is the owner of the IC card 1, and transmits the password to the IC card 1 such that authentication processing is executed.

The IC module 100 is provided with the contact portion 3 and the IC chip 10, and, for example, is a module traded in a form such as a COT (Chip On Tape) in which a plurality of IC modules 100 are arranged on a tape. The contact portion 3 has various signal terminals required for the IC card 1 to operate. Here, the various signal terminals include a terminal that receives supply of power supply voltages, clock signals, reset signals and the like from the external apparatus 2, and a serial data input/output terminal (SIO terminal) for communicating with the external apparatus 2.

The IC chip 10 is an LSI (Large Scale Integration) chip such as a one-chip microprocessor, for example. The IC chip 10 is provided with a communication I/F unit 4, a CPU (Central Processing Unit) 5, a ROM (Read Only Memory) 6, a RAM (Random Access Memory) 7 and an EEPROM (Electrically Erasable Programmable ROM) 8.

The communication I/F (Interface) unit 4 performs communication (transmission/reception of command/response) between the IC card 1 and the external apparatus 2. The CPU 5 executes programs stored in the ROM 6 or the EEPROM 8, and performs various types of processing of the IC card 1. The CPU 5 executes command processing that is based on a command received by the communication I/F (Interface) unit 4 via the contact portion 3, for example.

For example, the ROM 6 may be a non-volatile memory such as a mask ROM, and stores programs for executing various types of processing of the IC card 1, and data such as a command table. The RAM 7 is a volatile memory such as an SRAM (Static RAM), for example, and temporarily stores data used when performing various types of processing of the IC card 1.

The EEPROM 8 (an example of a storage) is an electrically rewritable non-volatile memory, for example. The EEPROM 8 stores PIN information to be described later, a parameter for generating an authentication PIN, a PIN initial value and the like.

Figure 2:
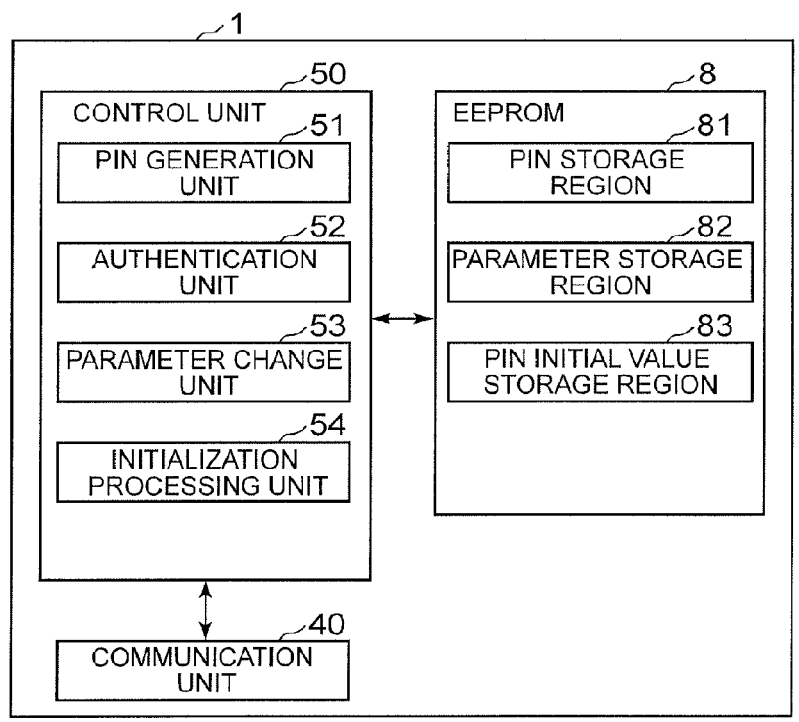
FIG. 2 is a block diagram showing an example of the functional configuration of the IC card of the first embodiment.

Next, an example of the functional configuration the IC card 1 according to this embodiment will be described with reference to FIG. 2. FIG. 2 is a block diagram showing an example of the functional configuration of the IC card 1 of this embodiment. As shown in this FIG. 2, the IC card 1 is provided with the EEPROM 8, a communication unit 40 and a control unit 50. The EEPROM 8 is provided with a PIN storage region 81, a parameter storage region 82 and a PIN initial value storage region 83. Here, the constituent elements shown in FIG. 2 are realized by using the hardware items shown in FIG. 1.

The PIN storage region 81 is a storage region for storing a PIN for authenticating the validity of a card holder. The PIN stored in the PIN storage region 81 is used as a PIN (first password) for generating a password (hereinafter, may be simply referred to as an authentication PIN) for authenticating the card holder (card user). Note that in this embodiment, the PIN stored in the PIN storage region 81 (hereinafter, may be simply referred to as a stored PIN) is also used as an authentication PIN (second password).

The parameter storage region 82 is a storage region for storing a parameter used when a PIN for authenticating a card holder is generated. Note that in this embodiment, the predetermined algorithm for generating (changing) an authentication PIN is addition processing (an example of calculation processing), and the parameter storage region 82 stores an addition value that is a parameter for the addition processing, for example.

The PIN initial value storage region 83 is a storage region for storing a PIN initial value. Here, the PIN initial value is a PIN that is registered when a card holder is registered in the IC card 1 and the IC card system 20 (see FIG. 3) to be described later, and is a PIN that is stored in the IC card 1 and the IC card system 20 at first.

The communication unit 40 is realized by the communication I/F unit 4, the CPU 5, and a program stored in the ROM 6, for example, and transmits/receives commands and responses to/from the external apparatus 2 via the contact portion 3.

The control unit 50 is realized by the CPU 5, the RAM 7, the ROM 6 or the EEPROM 8, for example, and performs overall control of the IC card 1. For example, the control unit 50 executes processing of various commands (command processing) transmitted from the external apparatus 2 to the IC card. Also, for example, the control unit 50 performs authentication processing using the authentication PIN stored in the PIN storage region 81, and changes the authentication PIN using a predetermined algorithm that can be known to the card holder or can be stored. Moreover, the control unit 50 is provided with a PIN generation unit 51, an authentication unit 52, a parameter change unit 53 and an initialization processing unit 54.

The PIN generation unit 51 (an example of a generation unit) generates an authentication PIN based on the stored PIN (first password) stored in the EEPROM 8 (the PIN storage region 81) in advance, the predetermined parameter and the predetermined algorithm that can be known to by the card holder. Here, calculation processing such as addition processing, subtraction processing, multiplication processing and cycle processing serves as the predetermined algorithm, for example, and in this embodiment, an example will be described in which processing for adding the predetermined parameter to the stored PIN stored in the EEPROM 8 serves as the predetermined algorithm as described above, as an example. Also, the predetermined parameter is a parameter that is used when generating an authentication PIN using the predetermined algorithm, and is here the addition value stored in the EEPROM 8 (the parameter storage region 82) as an example.

The PIN generation unit 51 generates a new authentication PIN based on the processing for adding the stored PIN stored in the PIN storage region 81 to the addition value stored in the parameter storage region 82, for example. In other words, the PIN generation unit 51 generates, as an authentication PIN, a value acquired by adding the value of the stored PIN to the addition value. Also, if the authentication unit 52, which will be described later, determines that the card holder is valid, the PIN generation unit 51 generates an authentication PIN, and stores, as the stored PIN, the authentication PIN in the PIN storage region 81 of the EEPROM 8. Specifically, for example, if the card holder is successfully authenticated using the stored PIN, the PIN generation unit 51 generates a PIN for the next authentication, and stores, as the stored PIN, the generated authentication PIN in the PIN storage region 81.

The authentication unit 52 compares an acquired PIN (third password) acquired from the external apparatus 2 and the authentication PIN, and determines the validity of the card user based on the comparison result. Specifically, the authentication unit 52 compares the acquired PIN input from the card holder via the external apparatus 2, for example, and the authentication PIN stored in the PIN storage region 81. If the acquired PIN and the authentication PIN match (in the case of comparison having been successful), the authentication unit 52 determines that the card holder who has input the acquired PIN to the external apparatus 2 is valid (authentication successful). And if the acquired PIN and the authentication PIN do not match (in the case of comparison having failed), the authentication unit 52 determines that the card holder who has input the acquired PIN to the external apparatus 2 is not valid (authentication failure).

If the authentication unit 52 determines that the card holder is valid (in the case of successful authentication), the parameter change unit 53 (an example of a change unit) changes the predetermined parameter stored in the EEPROM 8 (the parameter storage region 82) in accordance with a predetermined parameter (e.g., an addition value) change request. Specifically, if authentication using the authentication PIN is successful, when the IC card 1 receives, via the external apparatus 2, a command requesting to change an addition value, which is the predetermined parameter, the parameter change unit 53 changes the addition value stored in the parameter storage region 82. If the authentication unit 52 has successfully performed authentication using the authentication PIN, the parameter change unit 53 changes the addition value stored in the parameter storage region 82 to a new addition value input from the card holder via the external apparatus 2, for example. Specifically, the parameter change unit 53 stores, as a new addition value, the addition value acquired from the card holder, in the parameter storage region 82. Also, if authentication using the authentication PIN has not been successful, the parameter change unit 53 does not execute processing for changing the addition value.

If the authentication unit 52 determined that the card holder is valid (in the case of successful authentication), the initialization processing unit 54 changes the stored PIN stored in the EEPROM 8 (the PIN storage region 81) to the initial value of the PIN (authentication PIN) in accordance with an authentication PIN initialization request. Specifically, if authentication using the authentication PIN has been successful, when the IC card 1 receives a command to initialize the authentication PIN via the external apparatus 2, the initialization processing unit 54 changes the stored PIN stored in the PIN storage region 81 to the initial value of the PIN (authentication PIN). If authentication using the authentication PIN has been successful, the initialization processing unit 54 stores, in the PIN storage region 81, the PIN initial value stored in the PIN initial value storage region 83. In addition, if authentication using the authentication PIN has not been successful, the initialization processing unit 54 does not execute processing for initializing the authentication PIN.

Figures 3, 4:
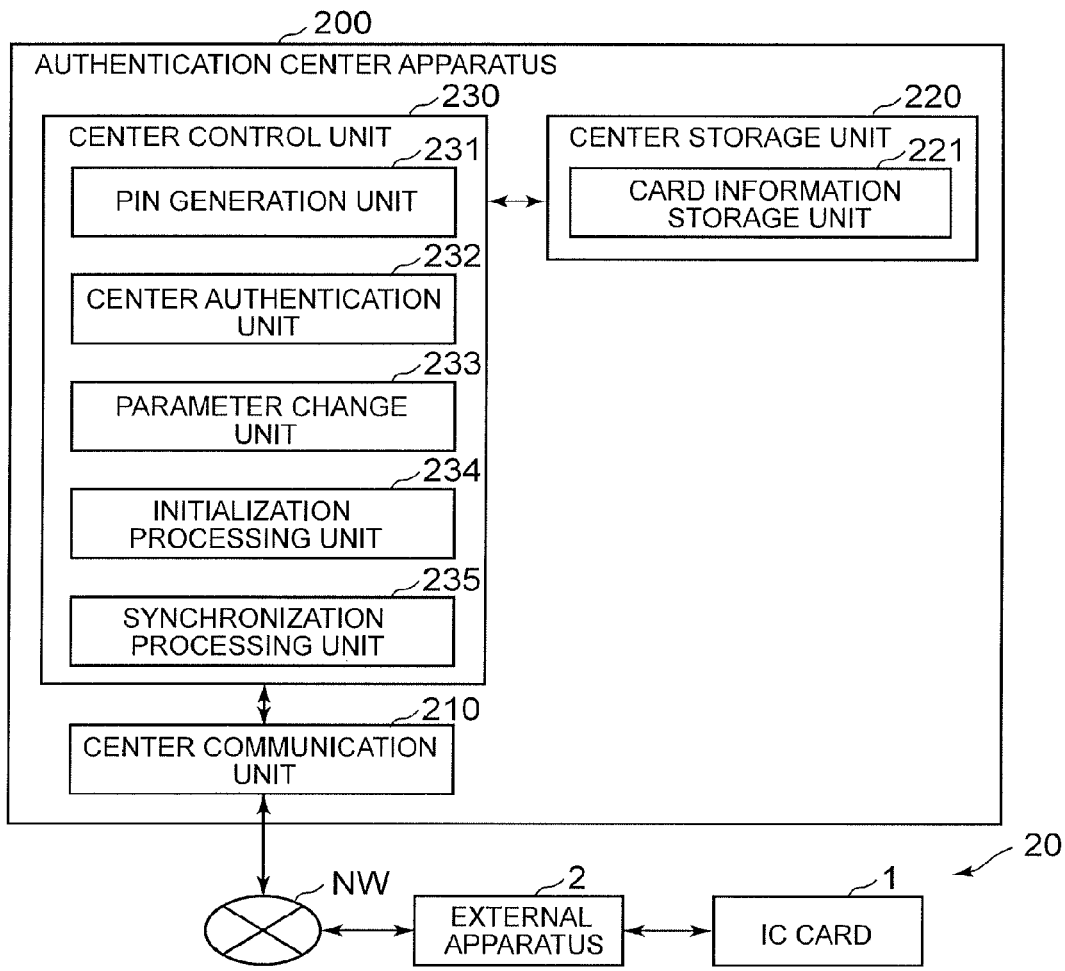
FIG. 3 is a block diagram showing an example of an IC card system of the first embodiment.
FIG. 4 is a diagram showing a data example of a card information storage unit of the first embodiment.

Next, a configuration example of the IC card system 20 according to this embodiment will be described with reference to FIG. 3. FIG. 3 is a block diagram showing an example of the IC card system 20 of this embodiment. As shown in this figure, the IC card system 20 is provided with an authentication center apparatus 200 and the external apparatus 2 and the IC card 1.

Note that the example shown in this figure represents a configuration example in which the IC card 1 is connected to the external apparatus 2, further connecting to the authentication center apparatus 200 via a network NW, and then performing on-line processing, for example. When performing such on-line processing, card holder authentication processing may be performed by the authentication center apparatus 200, and in the IC card system 20 according to this embodiment, the authentication center apparatus 200 is assumed to perform card holder authentication.

The authentication center apparatus 200 performs authentication of a registered card holder on the IC card 1 via the network NW online, and performs various types of processing (e.g., transaction processing) that uses the IC card 1. The authentication center apparatus 200 is provided with a center communication unit 210, a center storage unit 220 and a center control unit 230, for example.

The center communication unit 210 performs communication with the external apparatus 2 via the network NW. The center storage unit 220 stores information used for various types of processing performed by the authentication center apparatus 200. The center storage unit 220 is provided with a card information storage unit 221, for example. The card information storage unit 221 stores information regarding the IC card 1 used in the IC card system 20. For example, the card information storage unit 221 stores at least a "card ID", a "PIN initial value", a "PIN" and a "PAR" in association with each other as shown in FIG. 4.

Here, the "card ID" is identification information for identifying the IC card 1 registered in the IC card system 20, and the "PIN initial value" indicates the initial value of a PIN that the card holder of the IC card 1 has registered. Also, the "PIN" indicates an authentication PIN generated by a PIN generation unit 231, which will be described later, and changed. Specifically, the "PIN" indicates the value of a current PIN. In addition, the "PAR" indicates a parameter (e.g., an addition value) used when generating an authentication PIN. For example, the example shown in FIG. 4 indicates that the "PIN initial value" in the IC card 1 whose "card ID" is "XXXXX" is"0015", and the "PIN" is "0020". Moreover, in this case, it is indicated that the "PAR" is "0005".

Returning to the description with reference to FIG. 3, the center control unit 230 is a processor including a CPU (Central Processing Unit), for example, and performs overall control of the authentication center apparatus 200. For example, if the IC card 1 is subjected to on-line processing performed by the IC card system 20, the center control unit 230 performs card holder authentication processing and authentication PIN generation, similarly to the above-described the IC card 1. Also, the center control unit 230 performs processing for changing the "PAR" stored in the above-described card information storage unit 221, and "PIN" initialization processing respectively in accordance with a parameter change request and a PIN initialization request acquired from the card holder via the external apparatus 2. In addition, for example, if information regarding the PIN stored in the card information storage unit 221 and information regarding the PIN stored in the IC card 1 do not match, the center control unit 230 performs processing for synchronizing these pieces of information regarding the PINs. The center control unit 230 is provided with the PIN generation unit 231, a center authentication unit 232, a parameter change unit 233, an initialization processing unit 234 and a synchronization processing unit 235, for example.

The PIN generation unit 231 (an example of a center generation unit) generates an authentication PIN based on a stored PIN (authentication PIN) stored in the center storage unit 220, a predetermined parameter (e.g., an addition value) and a predetermined algorithm. In other words, the PIN generation unit 231 executes processing similar to the above-described processing of the PIN generation unit 51, in on-line processing of the IC card 1, for example.

The center authentication unit 232 compares an acquired PIN acquired from a card user via the external apparatus 2 and the authentication PIN stored in the card information storage unit 221, and determines the validity of the card holder based on the comparison result. In other words, the center authentication unit 232 executes processing similar to the above-described processing of the authentication unit 52, in on-line processing of the IC card 1, for example.

If the center authentication unit 232 has determined that the card holder is valid (in the case of successful authentication), the parameter change unit 233 changes the predetermined parameter stored in the card information storage unit 221 in accordance with a predetermined parameter (e.g., an addition value) change request. Specifically, the parameter change unit 233 executes processing similar to the above-described processing of the parameter change unit 53, in on-line processing of the IC card 1, for example. Note that the parameter change unit 233 acquires, via the center communication unit 210, the predetermined parameter change request requested by the card holder from the external apparatus 2, and changes the above-described "PAR" of the card information storage unit 221 in accordance with the acquired change request.

If the center authentication unit 232 has determined that the card holder is valid (in the case of successful authentication), the initialization processing unit 234 changes the stored PIN stored in the card information storage unit 221 to the initial value of the PIN (authentication PIN) in accordance with an authentication PIN initialization request. In other words, the initialization processing unit 234 executes processing similar to the above-described processing of the initialization processing unit 54, in on-line processing of the IC card 1, for example. Note that the initialization processing unit 234 acquires, via the center communication unit 210, the authentication PIN initialization request requested by the card holder from the external apparatus 2, and changes the above-described "PIN" of the card information storage unit 221 to the value of the "PIN initial value" that is the initial value of the PIN, in accordance with the acquired initialization request.

The synchronization processing unit 235 performs processing for synchronizing the "PIN" and "PAR" stored in the center storage unit 220 with the IC card 1. If the stored PIN and the predetermined parameter stored in the IC card 1 do not match the "PIN" and "PAR" corresponding to the IC card 1, the synchronization processing unit 235 performs synchronization processing. Specifically, for example, if the stored PIN and the predetermined parameter stored in the IC card 1 do not match the "PIN" and "PAR" stored in the center storage unit 220 in association with the "card ID" corresponding to the IC card 1, the synchronization processing unit 235 performs synchronization processing. Specifically, the synchronization processing unit 235 changes the "PIN" and "PAR" stored in the center storage unit 220 to the stored PIN and the predetermined parameter stored in the IC card 1.

Figure 5:
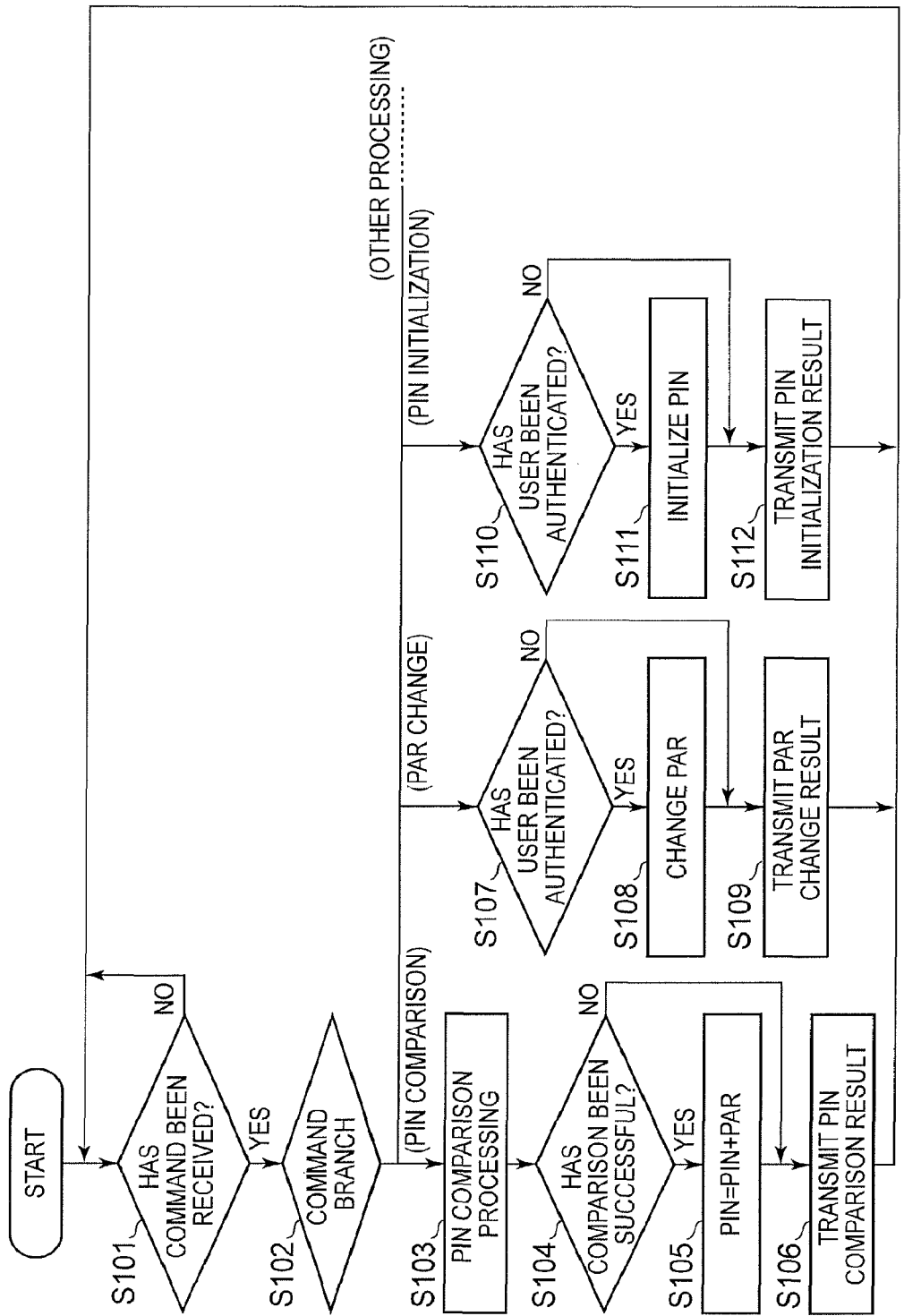
FIG. 5 is a flowchart showing an example of the operation of the IC card of the first embodiment.

Next, operations of the IC card 1 and the IC card system 20 according to this embodiment will be described with reference to the drawings. FIG. 5 is a flowchart showing an example of operations of the IC card 1 according to this embodiment. Here, an example will be described for a case where the IC card 1 is connected to the external apparatus 2, and is subjected to off-line processing.

As shown in this figure, the IC card 1 first determines whether or not a command has been received (step S101).

Specifically, the communication unit 40 of the IC card 1 determines whether or not a command has been received from the external apparatus 2 via the contact portion 3 and the communication I/F unit 4. If a command has been received (step S101: YES), the communication unit 40 advances the procedure to step S102. And if a command has not been received (step S101: NO), the communication unit 40 returns the procedure to step S101, and repeats the processing.

In step S102, the control unit 50 of the IC card 1 branches the processing in accordance with the received command. In the example shown in this figure, if the received command is a command to compares a PIN (PIN comparison), the control unit 50 advances the procedure to step S103. In addition, if the received command is a parameter change request (PAR change), the control unit 50 advances the procedure to step S107. Moreover, if the received command is an authentication PIN initialization request (PIN initialization), the control unit 50 advances the procedure to step S110.

In step S103, the authentication unit 52 of the control unit 50 executes PIN comparison processing. Specifically, the authentication unit 52 acquires an acquired PIN that is input to the external apparatus 2 by the card holder, and compares the acquired PIN and a stored PIN stored in the PIN storage region 81.

Next, the authentication unit 52 determines whether or not the comparison result indicates that comparison has been successful (step S104). For example, if the comparison result indicates that the acquired PIN and the stored PIN match and comparison has been successful (step S104: YES), the authentication unit 52 stores, for example, in the RAM 7, information indicating that comparison has been successful, and advances the procedure to step S105. Note that if the comparison is successful, the authentication unit 52 determines that the card holder is valid, enabling the IC card 1 to perform various types of transaction processing. In addition, for example, if the comparison result indicates that the acquired PIN and the stored PIN do not match (mismatch) and comparison has failed (step S104: NO), the authentication unit 52 advances the procedure to step S106. Note that if the comparison has failed, the authentication unit 52 determines that the card holder is not valid. If the card holder is not valid, the authentication unit 52 counts up error counter information (not illustrated) of the EEPROM 8 indicating the number of times that authentication has failed, for example. Furthermore, if the error counter information reaches a predetermined count value, execution of comparison processing using the authentication PIN may be forbidden.

In step S105, the PIN generation unit 51 of the control unit 50 generates an authentication PIN to be used for the next comparison, by performing addition processing (PIN=PIN+PAR). Specifically, the authentication unit 52 causes the PIN generation unit 51 to generate an authentication PIN, and, for example, the PIN generation unit 51 adds the addition value stored in the parameter storage region 82 (PAR) to the stored PIN stored in the PIN storage region 81 (PIN), to generate an authentication PIN. The PIN generation unit 51 stores the generated authentication PIN as a stored PIN in the PIN storage region 81.

Moreover, in step S106, the control unit 50 causes the PIN comparison result to be transmitted. Specifically, the control unit 50 causes the communication unit 40 to transmit the comparison result of the authentication unit 52 performing comparison (authentication result) as a response to the external apparatus 2. After the processing of step S106, the control unit 50 returns the procedure to step S101, and waits for the next command.

Also, in step S107, the parameter change unit 53 of the control unit 50 determines whether or not the user has been authenticated (the card holder has been authenticated). The parameter change unit 53 determines whether or not the card holder has been authenticated, in accordance with whether or not the above-described information indicating that the comparison has been successful is stored in the RAM 7, for example. If the card holder has been authenticated (step S107: YES), the parameter change unit 53 advances the procedure to step S108. Moreover, if the card holder has not been authenticated (step S107: NO), the parameter change unit 53 advances the procedure to step S109.

In step S108, the parameter change unit 53 changes the addition value (PAR) stored in the parameter storage region 82. Specifically, the parameter change unit 53 changes the addition value stored in the parameter storage region 82 to a new addition value acquired from the card holder via the external apparatus 2, for example.

In addition, in step S109, the control unit 50 causes the PAR change result to be transmitted. Specifically, the control unit 50 causes the communication unit 40 to transmit the result of the parameter change unit 53 changing the addition value (PAR change result), for example, as a response to the external apparatus 2. After the processing of step S109, the control unit 50 returns the procedure to step S101, and waits for the next command.

Moreover, in step S110, the initialization processing unit 54 of the control unit 50 determines whether or not the user has been authenticated (the card holder has been authenticated). The initialization processing unit 54 determines whether or not the card holder has been authenticated, in accordance with whether or not the above-described information indicating that the comparison has been successful is stored in the RAM 7, for example. If the card holder has been authenticated (step S110: YES), the initialization processing unit 54 advances the procedure to step S111. And if the card holder has not been authenticated (step S110: NO), the initialization processing unit 54 advances the procedure to step S112.

In step S111, the initialization processing unit 54 initializes the authentication PIN stored in the PIN storage region 81 (the stored PIN). Specifically, the initialization processing unit 54 changes the stored PIN stored in the PIN storage region 81 to the initial value of the PIN stored in the PIN initial value storage region 83.

In addition, in step S112, the control unit 50 causes the PIN initialization result to be transmitted. Specifically, the control unit 50 causes the communication unit 40 to transmit the result (PIN initialization result) of the initialization processing unit 54 initializing the authentication PIN (the stored PIN), for example, as a response to the external apparatus 2. After the processing of step S112, the control unit 50 returns the procedure to step S101, and waits for the next command.

Figure 6:
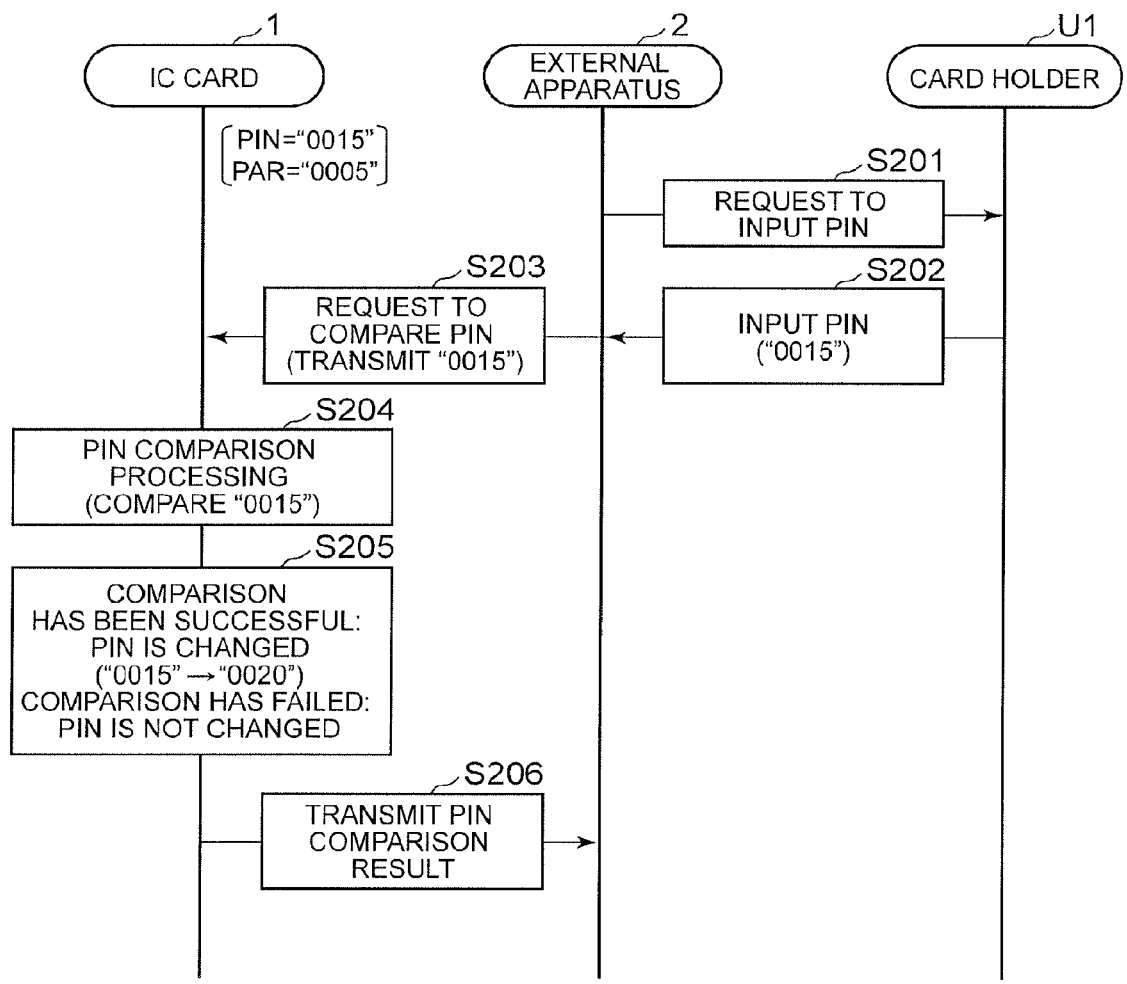
FIG. 6 is a diagram showing an example of authentication processing of the IC card of the first embodiment.

FIG. 6 is a diagram showing an example of authentication processing of the IC card 1 according to this embodiment. In this FIG. 6, the IC card 1 is in the state where the "PIN" (the stored PIN) is "0015", and the "PAR" (addition value) is "0005", and an example will be described in which authentication processing is performed with this state serving as an initial state, in the example shown in this figure. Note that the predetermined algorithm here is addition processing.

In FIG. 6, if a card holder U1 specifies, in the external apparatus 2, transaction processing that uses the IC card 1, and connects the IC card 1 to the external apparatus 2, the external apparatus 2 outputs a PIN input request to the card holder U1 (step S201). The external apparatus 2 outputs, to a menu screen of a display unit (not illustrated), for example, a display for prompting the card holder U1 to input the PIN, for example.

Next, when the PIN (e.g., "0015") is input to the external apparatus 2 by the card holder U1 (step S202), the external apparatus 2 transmits a PIN comparison request to the IC card 1 (step S203). Specifically, the external apparatus 2 transmits, for example, a PIN comparison command including "0015" as an acquired PIN to the IC card 1.

Next, the IC card 1 executes PIN comparison processing (e.g., comparison of "0015") in accordance with the PIN comparison command (step S204). The authentication unit 52 of the IC card 1 compares the acquired PIN "0015" and "0015" stored in the PIN storage region 81, for example. Note that the acquired PIN "0015" and "0015" stored in the PIN storage region 81 match here, and thus the authentication unit 52 determines that comparison has been successful.

Next, if the comparison has been successful, the PIN generation unit 51 of the IC card 1 changes the PIN, and if the comparison has failed, does not change the PIN (step S205). Note that in this example, the authentication unit 52 determines that comparison has been successful, and thus the PIN generation unit 51 performs processing for adding "0005" to "0015" so as to generate an authentication PIN "0020" to be used next time. The PIN generation unit 51 stores the generated authentication PIN "0020" in the PIN storage region 81.

Next, the IC card 1 transmits the PIN comparison result to the external apparatus 2 (step S206). Specifically, the control unit 50 of the IC card 1 causes the communication unit 40 to transmit the PIN comparison result of the authentication unit 52. The IC card 1 according to this embodiment changes the authentication PIN in this manner every time PIN comparison (authentication of the card holder U1) is successfully performed.

Figure 7:
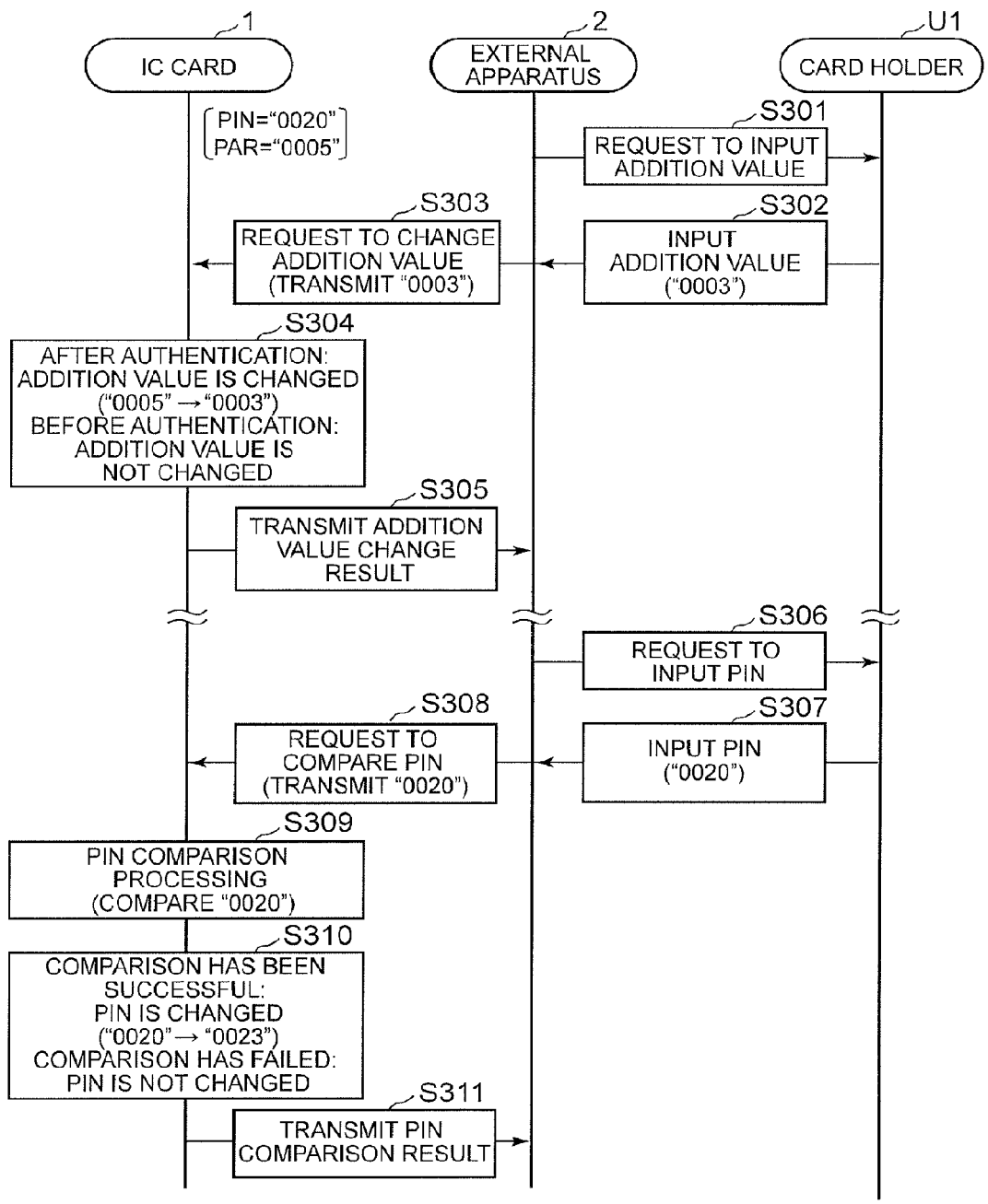
FIG. 7 is a diagram showing an example of parameter change processing of the IC card of the first embodiment.

Next, parameter change processing of the IC card 1 according to this embodiment will be described with reference to FIG. 7. FIG. 7 is a diagram showing an example of parameter change processing of the IC card 1 of this embodiment. In this FIG. 7, the IC card 1 is in the state where the "PIN" (the stored PIN) is "0020" and the "PAR" (addition value) is "0005", and an example will be described in which parameter change processing is performed with a state after performing authentication processing shown in FIG. 6 serving as an initial state. Specifically, the IC card 1 is in the state where the card holder U1 has been authenticated, and the stored PIN is "0020".

In FIG. 7, if the card holder U1 specifies parameter change processing in the external apparatus 2, the external apparatus 2 transmits, to the card holder U1, a request to input an addition value to be changed (step S301). The external apparatus 2 outputs, to the menu screen of the display unit (not illustrated), a display for prompting the card holder U1 to input an addition value to be changed, for example.

Next, when an addition value (e.g., "0003") is input to the external apparatus 2 by the card holder U1 (step S302), the external apparatus 2 transmits a parameter change request to the IC card 1 (step S303). Specifically, the external apparatus 2 transmits, to the IC card 1, an addition value change command including the acquired addition value (e.g., "0003").

Next, if the card holder U1 has already been authenticated, the IC card 1 changes the addition value in accordance with the parameter change command, and if the card holder U1 has not yet been authenticated, does not change the addition value (step S304). Note that in this example, the card holder U1 has been already authenticated, and thus the parameter change unit 53 changes the addition value "0005" to "0003". Specifically, the parameter change unit 53 changes the addition value "0005 stored in the parameter storage region 82" to the acquired addition value "0003".

Next, the IC card 1 transmits the addition value change result to the external apparatus 2 (step S305). Specifically, the control unit 50 of the IC card 1 causes the communication unit 40 to transmit the addition value result of the parameter change unit 53.

Note that if PIN comparison processing is to be performed next, the processing of steps S306 to S311 that is similar to the processing of steps S201 to S206 shown in FIG. 6 is executed. However, in the processing of steps S306 to S311, the addition value stored in the parameter storage region 82 is "0003". Therefore, in step S310, the PIN generation unit 51 performs processing for adding "0003" to "0020" so as to generate an authentication PIN"0023" to be used next time.

In this manner, if it is determined that the card holder U1 is valid (in the case of successful authentication), the parameter change unit 53 of the IC card 1 changes the addition value stored in the parameter storage region 82 in accordance with an addition value change command.

Figure 8:
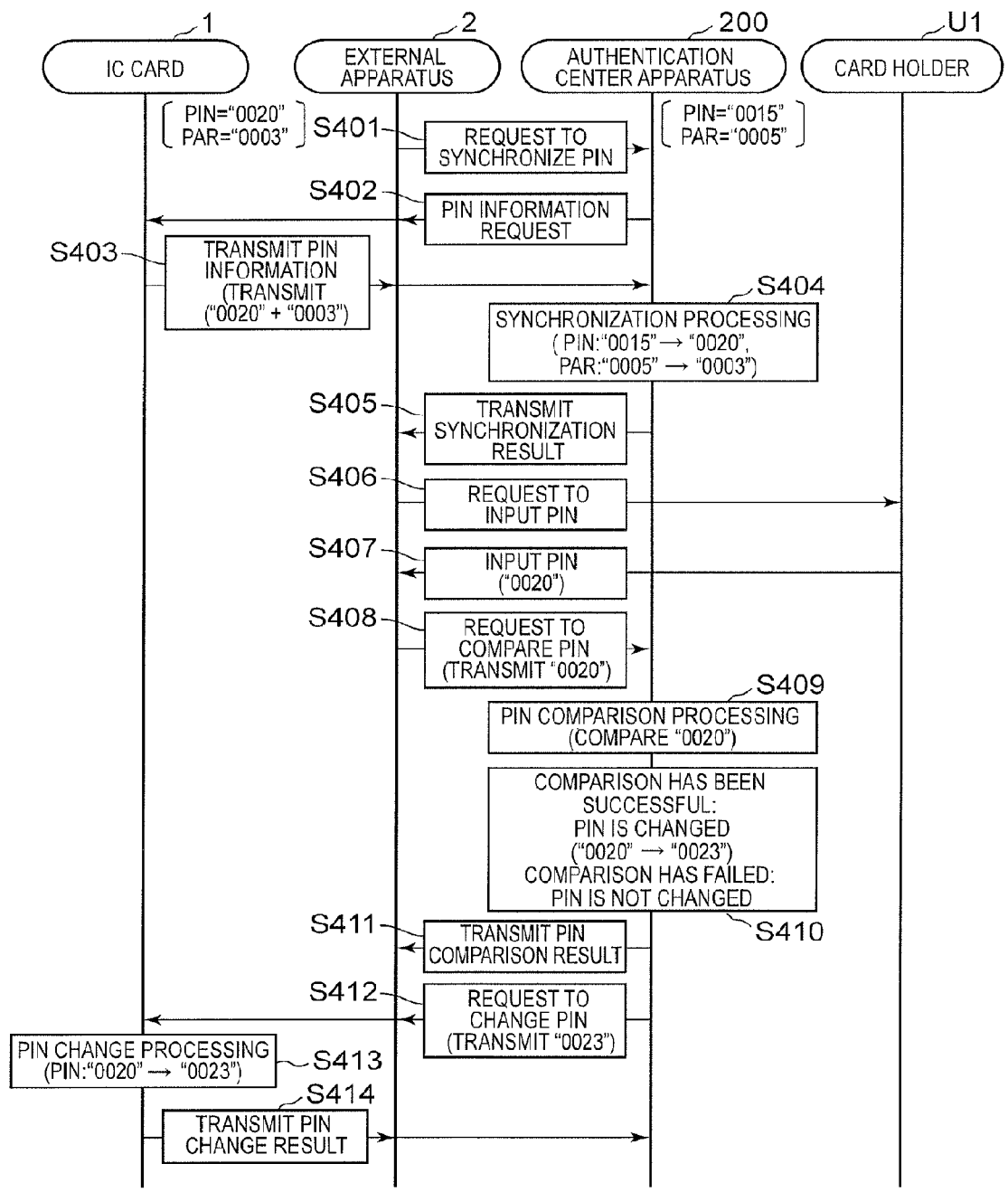
FIG. 8 is a diagram showing an example of center authentication processing of the IC card system of the first embodiment.

Next, center authentication processing by on-line processing of the IC card system 20 according to this embodiment will be described with reference to FIG. 8. FIG. 8 is a diagram showing an example of center authentication processing of the IC card system 20 of this embodiment. In this FIG. 8, a case will be described in which the IC card 1 is in a state where the "PIN" (stored PIN) is "0020", and the "PAR" (addition value) is "0003", and the authentication center apparatus 200 is in a state where the "PIN" (stored PIN) is "0015", and the "PAR" (addition value) is "0005". In other words, this case corresponds to the state where PIN information does not match between the IC card 1 and the authentication center apparatus 200.

In FIG. 8, the external apparatus 2 is connected to the authentication center apparatus 200 via the network NW, and the external apparatus 2 first transmits a PIN synchronization request to the authentication center apparatus 200 (step S401). Next, the authentication center apparatus 200 transmits a PIN information request to the IC card 1 via the external apparatus 2 in accordance with the PIN synchronization request (step S402). Specifically, the external apparatus 2 transmits a PIN information acquisition command to the IC card 1 in accordance with the request from the authentication center apparatus 200.

Next, the IC card 1 transmits PIN information to the authentication center apparatus 200 via the external apparatus 2 (step S403). Specifically, the control unit 50 of the IC card 1 causes the communication unit 40 to transmit, to the external apparatus 2, a stored PIN "0020" stored in the PIN storage region 81 and an addition value "0003" stored in the parameter storage region 82 in accordance with the PIN information acquisition command, and the external apparatus 2 transmits this PIN information to the authentication center apparatus 200. Note that the IC card 1 is assumed to transmit PIN information if key comparison using a center key shared with the authentication center apparatus 200 (center authentication) has been successful, for example. Key comparison using a center key (center authentication) is assumed here to have been performed before the PIN information request, although illustration thereof is omitted in FIG. 8.

Next, the authentication center apparatus 200 executes PIN information synchronization processing (step S404). In this example, the stored PIN and the predetermined parameter stored in the IC card 1 do not match the "PIN" and the "PAR" corresponding to the IC card 1, and thus the synchronization processing unit 235 of the authentication center apparatus 200 performs synchronization processing. Specifically, the synchronization processing unit 235 changes the "PIN" of the card information storage unit 221 corresponding to the IC card 1 from "0015" to "0020", and changes the "PAR" from "0005" to "0003".

Next, the authentication center apparatus 200 transmits the synchronization result to the external apparatus 2 (step S405). Next, the external apparatus 2 outputs a PIN input request to the card holder U1 (step S406). The external apparatus 2 outputs, to the menu screen of the display unit (not illustrated), a display for prompting the card holder U1 to input the PIN, for example.

Next, when the PIN (e.g., "0020") is input to the external apparatus 2 by the card holder U1 (step S407), the external apparatus 2 transmits a PIN comparison request to the authentication center apparatus 200 (step S408). Specifically, the external apparatus 2 transmits a PIN comparison request including "0020", for example, as an acquired PIN to the authentication center apparatus 200.

Next, the authentication center apparatus 200 executes PIN comparison processing (e.g., comparison of "0020") in accordance with the PIN comparison request (step S409). The center authentication unit 232 of the authentication center apparatus 200 compares the acquired PIN "0020" and "0020" stored in the card information storage unit 221, for example. Note that the acquired PIN "0020" and "0020" stored in the card information storage unit 221 match here, and thus the center authentication unit 232 determines that comparison has been successful.

Next, if the comparison has been successful, the PIN generation unit 231 of the authentication center apparatus 200 changes the PIN, and if the comparison has failed, does not change the PIN (step S410). Note that in this example, the center authentication unit 232 determines that comparison has been successful, and thus the PIN generation unit 231 performs processing for adding "0003" to "0020", so as to generate an authentication PIN"0023" to be used next time. The PIN generation unit 231 stores the generated authentication PIN"0023" in the card information storage unit 221.

Next, the authentication center apparatus 200 transmits the PIN comparison result to the external apparatus 2 (step S411). Specifically, the center control unit 230 of the authentication center apparatus 200 causes the center communication unit 210 to transmit the PIN comparison result of the center authentication unit 232. The authentication center apparatus 200 according to this embodiment changes the authentication PIN in this manner every time PIN comparison (authentication of the card holder U1) is successfully performed in on-line processing.

Next, the authentication center apparatus 200 transmits a PIN change request to the IC card 1 (step S412). Specifically, the authentication center apparatus 200 transmits a PIN change request command including the changed authentication PIN"0023" via the external apparatus 2 to the IC card 1, in order to synchronize the IC card 1 with the PIN information.

The control unit 50 of the IC card 1 performs PIN information change processing in accordance with the PIN change request command (step S413). Specifically, the control unit 50 changes the PIN "0020" stored in the PIN storage region 81 to "0023". Note that, for example, if key comparison using a center key (center authentication) has been successful, the control unit 50 performs PIN information change processing.

Next, the IC card 1 transmits the PIN change result to the authentication center apparatus 200 via the external apparatus 2 (step S414). Specifically, the control unit 50 of the IC card 1 causes the communication unit 40 to transmit the PIN change result. In this manner, in the IC card system 20 according to this embodiment, during on-line processing, the authentication center apparatus 200 performs authentication processing similar to that of the IC card 1, and further synchronizes the PIN information between the authentication center apparatus 200 and the IC card 1.

As described above, the IC card 1 according to this embodiment is provided with the PIN generation unit 51 and the authentication unit 52. The PIN generation unit 51 generates a PIN (second password) for authenticating the card holder based on a stored PIN (first password) stored in the EEPROM 8 (storage unit) in advance, a predetermined parameter (e.g., an addition value) and a predetermined algorithm (e.g., addition processing). The authentication unit 52 compares an acquired PIN (third password) acquired from the external apparatus 2 and the authentication PIN, and determines the validity of the card holder based on the comparison result. Accordingly, the IC card 1 according to this embodiment changes, as dynamic data, the authentication PIN for every authentication processing, and thus it is possible to reduce the possibility of a third party posing as the card holder and fraudulently using the card, for example. Therefore, the IC card 1 according to this embodiment can improve the security.

Moreover, in this embodiment, the EEPROM 8 stores the predetermined parameter (e.g., an addition value) in advance, and the predetermined algorithm includes predetermined calculation processing (e.g., addition processing) of the stored PIN and the predetermined parameter (e.g., an addition value). The PIN generation unit 51 generates an authentication PIN based on the predetermined calculation processing (e.g., addition processing) of the stored PIN and the predetermined parameter (e.g., an addition value). Accordingly, the authentication PIN is generated by calculation processing, and thus the IC card 1 according to this embodiment can change the authentication PIN by a simpler technique.

Moreover, the IC card 1 according to this embodiment is provided with the parameter change unit 53. If the authentication unit 52 determines that the card holder is valid, the parameter change unit 53 changes the predetermined parameter (e.g., an addition value) stored in the EEPROM 8 in accordance with a predetermined parameter change request (e.g., a change request command). Accordingly, if the card holder is valid (in the case of successful authentication), the parameter is changed, and thus the IC card 1 according to this embodiment can change the parameter while ensuring security. Therefore, for example, the IC card 1 according to this embodiment can reduce the possibility that the authentication PIN generation algorithm is found by a third party, by periodically changing the predetermined parameter. Therefore, the IC card 1 according to this embodiment can further improve the security.

Moreover, in this embodiment, if the authentication unit 52 determines that the card user is valid, the PIN generation unit 51 generates an authentication PIN to be used for the next comparison, based on a predetermined algorithm, and stores the authentication PIN as a stored PIN in the EEPROM 8. When the next comparison is performed, the authentication unit 52 then compares an acquired PIN and the authentication PIN stored as a stored PIN in the EEPROM 8. Accordingly, the IC card 1 according to this embodiment performs authentication processing using the authentication PIN stored in the EEPROM 8, and thus the processing amount (calculation amount) of the CPU 5 can be reduced compared to the case of generating an authentication PIN every time. Specifically, the IC card 1 according to this embodiment can improve the security without placing a load on the CPU 5.

In addition, in this embodiment, the EEPROM 8 stores the initial value of the authentication PIN. The IC card 1 is further provided with the initialization processing unit 54 that changes the stored PIN stored in the EEPROM 8 to the initial value of the authentication PIN in accordance with an authentication PIN initialization request (e.g., an initialization command) if the authentication unit 52 determines that the card user is valid. Accordingly, with the IC card 1 according to this embodiment, the card holder can return the current authentication PIN to the initial value while ensuring security.

The IC module 100 according to this embodiment is provided with the PIN generation unit 51 and the authentication unit 52. The PIN generation unit 51 generates a PIN (second password) for authenticating the card holder based on a stored PIN (first password) stored in the EEPROM 8 (storage unit) in advance, a predetermined parameter (e.g., an addition value) and a predetermined algorithm (e.g., addition processing). The authentication unit 52 compares an acquired PIN (third password) acquired from the external apparatus 2 and the authentication PIN, and determines the validity of the card holder based on the comparison result. Accordingly, the module 100 according to this embodiment can improve the security similarly to the IC card 1.

Also, according to this embodiment, the IC card system 20 is provided with the IC card 1 and the authentication center apparatus 200 that is connected to the IC card 1 via the external apparatus 2. The authentication center apparatus 200 is provided with the center storage unit 220, the PIN generation unit 231 (center generation unit), the center authentication unit 232 and the synchronization processing unit 235. The center storage unit 220 stores card identification information (e.g., a card ID) for identifying the IC card 1, a stored PIN (PIN for the next authentication) and a predetermined parameter in association with each other. The PIN generation unit 231 generates an authentication PIN based on the stored PIN and the predetermined parameter (e.g., an addition value) stored in the center storage unit 220 and a predetermined algorithm (e.g., addition processing). The center authentication unit 232 compares an acquired PIN acquired from the card holder via the external apparatus 2 and the authentication PIN, and determines the validity of the card holder based on the comparison result. If the stored PIN and the predetermined parameter (e.g., an addition value) stored in the IC card 1 does not match the stored PIN stored in the center storage unit 220 in association with a card ID corresponding to the IC card 1 and the predetermined parameter (e.g., an addition value), the synchronization processing unit 235 changes the stored PIN and the predetermined parameter stored in the center storage unit 220 to the stored PIN and the predetermined parameter stored in the IC card 1.

Accordingly, the IC card system 20 according to this embodiment can improve the security similarly to the above-described IC card 1. In addition, it is possible to synchronize the authentication PIN and the parameter stored in the IC card 1 with the authentication PIN and the parameter stored in the authentication center apparatus 200, and thus, for example, even if both off-line processing and on-line processing are performed, the IC card system 20 according to this embodiment can appropriately change the authentication PIN and the parameter.

In the above embodiment, an example has been described in which, if authentication processing has been successful, the PIN generation unit 51 generates an authentication PIN to be compared next time, and stores the authentication PIN to be compared next time as a stored PIN in the EEPROM 8, but there is no limitation thereto. For example, a configuration may be adopted in which the PIN generation unit 51 generates an authentication PIN based on the stored PIN stored in the EEPROM 8 every time authentication processing is performed, and if authentication using the generated authentication PIN processing is successful, the generated authentication PIN is stored as a stored PIN.

Second Embodiment

Next, an IC card 1a according to a second embodiment will be described with reference to the drawings. In this embodiment, for example, an example will be described for a case where the IC card 1a outputs information serving as a hint for generating a current authentication PIN when the card holder has forgotten a changed authentication PIN. Note that the hardware configuration of the IC card 1a according to this embodiment is similar to that of the first embodiment shown in FIG. 1, and thus their description is omitted here.

Figure 9:
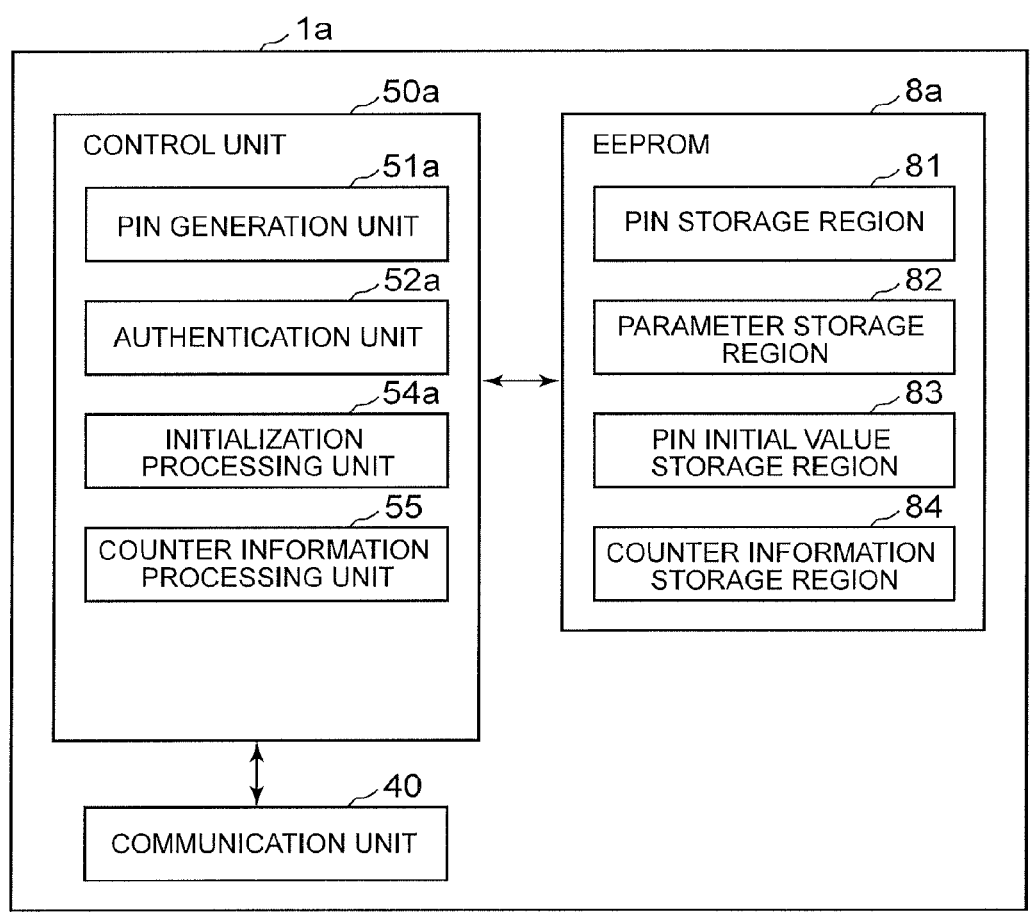
FIG. 9 is a block diagram showing an example of the functional configuration of an IC card of a second embodiment.

FIG. 9 is a block diagram showing an example of the functional configuration of the IC card 1a of this embodiment. As shown in this FIG. 9, the IC card 1a is provided with an EEPROM 8a, a communication unit 40 and a control unit 50a. The EEPROM 8a is provided with a PIN storage region 81, a parameter storage region 82, a PIN initial value storage region 83 and a counter information storage region 84. Also, the control unit 50a is provided with a PIN generation unit 51a, an authentication unit 52a, an initialization processing unit 54a and a counter information processing unit 55. Here, the constituent elements shown in FIG. 9 are realized by using the hardware items shown in FIG. 1. Note that in this figure, the same reference numerals are assigned to the same constituent elements as the functional configuration shown in FIG. 2, and its description is omitted.

The counter information storage region 84 stores counter information indicating the number of times an authentication PIN has been generated. The authentication unit 52a executes the following first authentication processing and second authentication processing. The authentication unit 52a compares an acquired PIN and an authentication PIN in the first authentication processing, and determines the validity of the card holder based on the comparison result. In addition, the authentication unit 52a compares an acquired initial PIN (fourth password) acquired from an external apparatus 2 and the initial value of an authentication PIN in the second authentication processing, and determines the validity of the card holder based on the comparison result. Specifically, in the second authentication processing, the authentication unit 52a executes authentication processing using the initial value of the PIN stored in the PIN initial value storage region 83.

If the authentication unit 52a determines based on the first authentication processing that the card holder is valid, the PIN generation unit 51a generates an authentication PIN, and updates the counter information stored in the EEPROM 8a (the counter information storage region 84). Specifically, the PIN generation unit 51a adds "1" to the value of the counter information stored in the counter information storage region 84, and stores the result in the counter information storage region 84 again. Note that the other functions of the PIN generation unit 51a are similar to those of the PIN generation unit 51 of the first embodiment.

If the authentication unit 52a determines based on the second authentication processing that the card holder is valid, the counter information processing unit 55 causes the counter information stored in the counter information storage region 84 to be output to the external apparatus 2. Note that if the counter information stored in the counter information storage region 84 is found, the card holder can calculate the current authentication PIN from the initial value of the PIN and the value of a parameter.

If the authentication unit 52a determines based on the first authentication processing that the card holder is valid, the initialization processing unit 54a changes the stored PIN that is stored in the EEPROM 8a to the initial value of the authentication PIN in accordance with an authentication PIN initialization request. The initialization processing unit 54a then initializes the counter information stored in the counter information storage region 84 of the EEPROM 8a during this initialization processing. Specifically, the initialization processing unit 54a stores "0", for example, as counter information stored in the counter information storage region 84.

Figure 10:
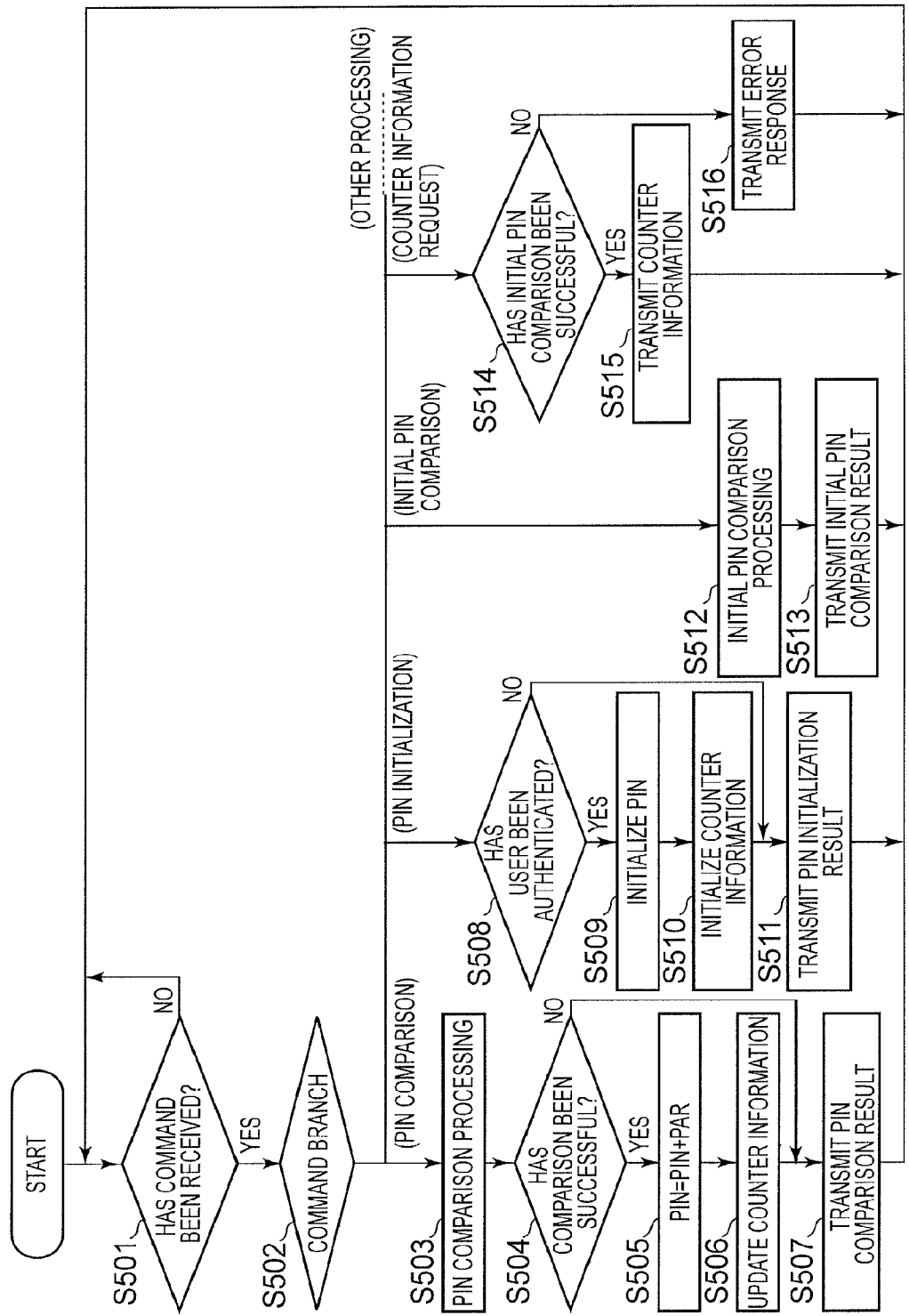
FIG. 10 is a flowchart showing an example of the operation of the IC card of the second embodiment.

Next, an example of operations of the IC card 1a according to this embodiment will be described with reference to FIG. 10. FIG. 10 is a flowchart showing an example of the operations of the IC card 1a of this embodiment. In this FIG. 10, the processing of steps S501 and S502 is similar to the processing of steps S101 and S102 shown in FIG. 5, and thus its description is omitted here.

Note that in the command branch processing in step S502, if the received command is a command to compare a PIN (PIN comparison), the control unit 50a advances the procedure to step S503. And if the received command is an authentication PIN initialization request (PIN initialization), the control unit 50a advances the procedure to step S508. Moreover, if the received command is a command to compare a PIN initial value (initial PIN comparison), the control unit 50a advances the procedure to step S512. Additionally, if the received command is a command to request output of counter information (counter information request), the control unit 50a advances the procedure to step S514.

PIN comparison processing (the first authentication processing) of steps S503 to S507 is similar to the processing of steps S103 to S106 shown in FIG. 5 except that the processing of step S506 is added. In step S506, the PIN generation unit 51a of the control unit 50a updates the counter information stored in the counter information storage region 84. Specifically, the PIN generation unit 51a adds "1" to the value of the counter information stored in the counter information storage region 84, and stores the result in the counter information storage region 84 again.

Also, PIN initializing processing of steps S508 to S511 is similar to the processing of steps S110 to S112 shown in FIG. 5, except that the processing of step S510 is added. In step S510, the initialization processing unit 54a of the control unit 50a initializes the counter information. Specifically, the initialization processing unit 54a causes "0", for example, to be stored as counter information stored in the counter information storage region 84.

In step S512, the authentication unit 52a of the control unit 50a performs initial PIN comparison processing as the second authentication processing. The authentication unit 52a compares an acquired initial PIN acquired from the external apparatus 2 and the initial value of an authentication PIN, and determines the validity of the card holder based on the comparison result. In other words, the authentication unit 52a executes, in the second authentication processing, authentication processing using the initial value of the PIN stored in the PIN initial value storage region 83. Note that the authentication unit 52a stores, in the RAM 7, information indicating the comparison result. In addition, if the comparison has failed, for example, the authentication unit 52a counts up error counter information (not illustrated) of the EEPROM 8a indicating the number of times authentication has failed, and furthermore, if the error counter information reaches a predetermined count value, execution of comparison processing using the initial PIN may be forbidden.

In step S513, the control unit 50a causes the initial PIN comparison result to be transmitted. Specifically, the control unit 50a causes the communication unit 40 to transmit the comparison result (authentication result) of the authentication unit 52a comparing the initial PIN, as a response to the external apparatus 2. After the processing of step S513, the control unit 50a returns the procedure to step S501, and waits for the next command.

In step S514, the counter information processing unit 55 of the control unit 50a determines whether or not initial PIN comparison has been successful. The counter information processing unit 55 determines whether or not initial PIN comparison has been successful, for example, in accordance with whether or not the above-described information indicating initial PIN comparison has been successful is stored in the RAM 7. If initial PIN comparison has been successful (step S514: YES), the counter information processing unit 55 advances the procedure to step S515. In addition, if initial PIN comparison has not been successful (step S514: NO), the counter information processing unit 55 advances the procedure to step S516.

In step S515, the counter information processing unit 55 transmits the counter information to the external apparatus 2. Specifically, the counter information processing unit 55 causes the counter information stored in the counter information storage region 84 to be output to the external apparatus 2 via the communication unit 40. After the processing of step S515, the control unit 50a returns the procedure to step S501, and waits for the next command.

In step S516, the counter information processing unit 55 transmits an error response to the external apparatus 2. Specifically, the counter information processing unit 55 causes a response (error response) indicating that comparison using the initial PIN has not been successful to be output to the external apparatus 2 via the communication unit 40. After the processing of step S516, the control unit 50a returns the procedure to step S501, and waits for the next command.

Figure 11:
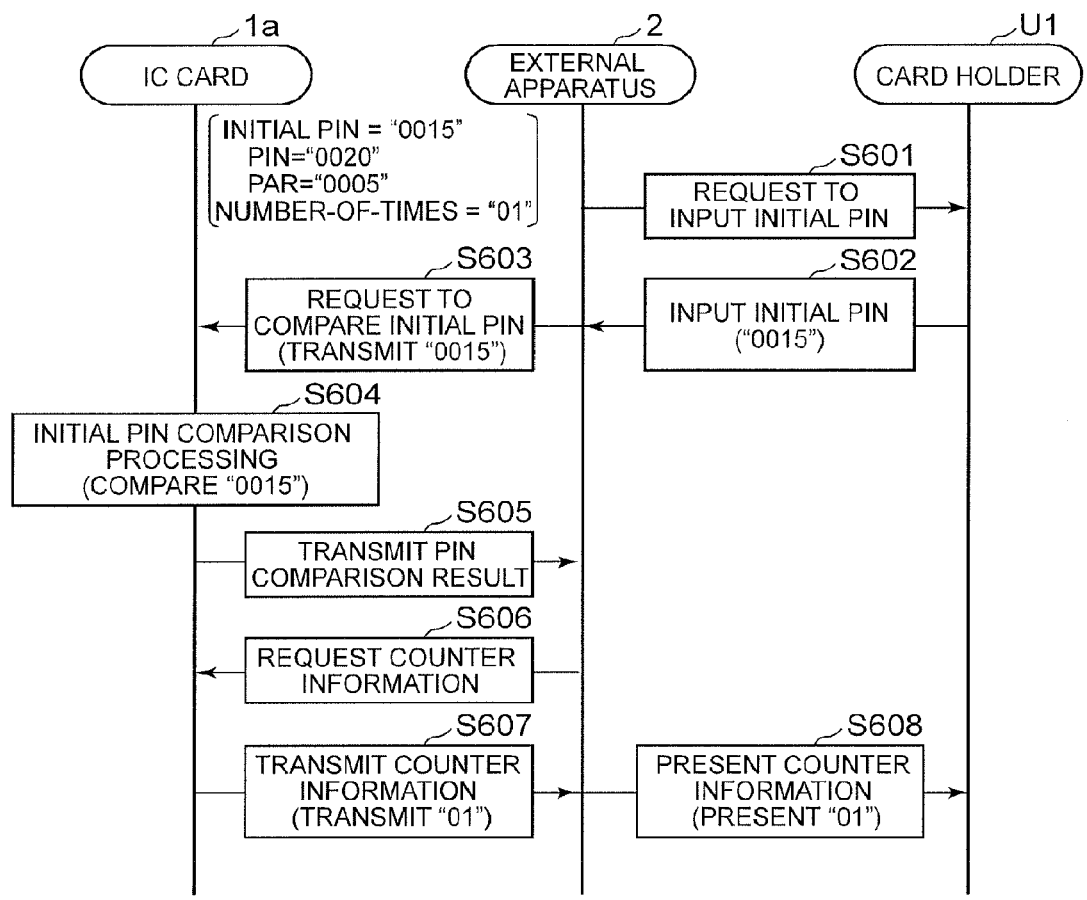
FIG. 11 is a diagram showing an example of counter information output processing of the IC card of the second embodiment.

Next, counter information output processing performed by the IC card 1a according to this embodiment will be described with reference to FIG. 11. FIG. 11 is a diagram showing an example of the counter information output processing of the IC card 1a of this embodiment. In this FIG. 11, the IC card 1a is in the state where the "initial PIN" (PIN initial value) is "0015", the "PIN" (stored PIN) is "0020", the "PAR" (addition value) is "0005", and the "the number of times" (counter information) is "01", and an example will be described in which the counter information output processing is performed with this state serving as an initial state, in the example shown in this FIG. 11. Note that the predetermined algorithm here is addition processing.

In FIG. 11, if the card holder U1 specifies, in the external apparatus 2, the display of information regarding the counter the PIN has been changed, the external apparatus 2 outputs an initial PIN input request to the card holder U1 (step S601). The external apparatus 2 outputs, to a menu screen of a display unit (not illustrated), a display for prompting the card holder to input an initial PIN, for example.

Next, when an initial PIN (e.g., "0015") is input to the external apparatus 2 by the card holder U1 (step S602), the external apparatus 2 transmits an initial PIN comparison request to the IC card 1a (step S603). Specifically, for example, the external apparatus 2 transmits an initial PIN comparison command including "0015" to the IC card 1a, as an acquired PIN.

Next, the IC card 1a executes initial PIN comparison processing (e.g., comparison of "0015") in accordance with the initial PIN comparison command (step S604). The authentication unit 52a of the IC card 1a compares the acquired PIN "0015" and "0015" stored in the PIN initial value storage region 83, for example. Note that, here, the acquired PIN "0015" and "0015" stored in the PIN initial value storage region 83 match, and thus the authentication unit 52a determines that comparison has been successful.

Next, the IC card 1a transmits the initial PIN comparison result to the external apparatus 2 (step S605). Specifically, the control unit 50a of the IC card 1a causes the communication unit 40 to transmit the initial PIN comparison result of the authentication unit 52a. Next, the external apparatus 2 transmits a counter information request to the IC card 1a (step S605). Specifically, the external apparatus 2 transmits a counter information request command to the IC card 1a.

Next, the IC card 1a transmits the counter information to the external apparatus 2 in accordance with the counter information request command (step S607). Specifically, the counter information processing unit 55 of the IC card 1a causes the counter information "01 stored in the counter information storage region 84" to be transmitted to the external apparatus 2 via the communication unit 40. Next, the external apparatus 2 presents, to the card holder U1, information regarding the number of times of the output of the IC card 1a (step S608). Specifically, the external apparatus 2 displays, on the display unit, the counter information "01" acquired from the IC card 1a. Accordingly, the card holder U1 can acquire (obtain) the counter information, and easily calculate the current authentication PIN from the algorithm (here, addition processing) known to the card holder U1 in advance, an addition value serving as a parameter, and the counter information.

Note that except that the above-described processing related to counter information is added, the basic processing of the IC card 1a of this embodiment is similar to that of the IC card 1 of the first embodiment, and thus a description regarding other processing is omitted. In addition, in the above embodiment, an example has been described in which the IC card 1a is not provided with the parameter change unit 53, but the IC card 1a may also be provided with the parameter change unit 53 similarly to the first embodiment. Note that in this case, the initialization processing unit 54a may perform initialization processing when the parameter change unit 53 changes a predetermined parameter (e.g., an addition value). Moreover, the IC card system 20 in which the IC card 1a of this embodiment is used is similar to that of the first embodiment except that counter information synchronization processing is added, and thus its description is omitted here.

As described above, in the IC card 1a according to this embodiment, the EEPROM 8a stores the initial value of an authentication PIN and counter information indicating the number of times an authentication PIN has been generated. Additionally, the authentication unit 52a of this embodiment executes first authentication processing and second authentication processing. The authentication unit 52a compares, in the first authentication processing, an acquired PIN and the authentication PIN, and determines the validity of the card holder based on the comparison result. Also, the authentication unit 52a compares, in the second authentication processing, an acquired initial PIN (fourth password) acquired from the external apparatus 2 and the initial value of the authentication PIN, and determines the validity of the card holder based on the comparison result. If it is determined from the first authentication processing performed by the authentication unit 52a that the card holder is valid, the PIN generation unit 51a generates a second password, and updates counter information stored in the EEPROM 8a. Furthermore, the IC card 1a is provided with the counter information processing unit 55 for outputting the counter information to the external apparatus 2 if it is determined from the second authentication processing performed by the authentication unit 52a that the card holder is valid.

Accordingly, the IC card 1a according to this embodiment can notify the card holder of the counter information indicating the number of times an authentication PIN has been generated, while ensuring security, and thus even if the card holder has forgotten the current authentication PIN, the card holder can independently generate an authentication PIN. Even if the card holder has forgotten the current authentication PIN, the IC card 1a according to this embodiment can enable authentication processing that uses an authentication PIN, and thus convenience can be improved.

Moreover, in this embodiment, the IC card 1a is provided with the initialization processing unit 54a. If it is determined from the first authentication processing performed by the authentication unit 52a that the card holder is valid, the initialization processing unit 54a changes the stored PIN stored in the EEPROM 8a to the initial value of the authentication PIN in accordance with an authentication PIN initialization request (e.g., an initialization command). Furthermore, the initialization processing unit 54a initializes the counter information stored in the EEPROM 8a in accordance with the authentication PIN initialization request. Accordingly, in the IC card 1a according to this embodiment, the card holder can return the current authentication PIN and the counter information to the initial values, while ensuring security.

Third Embodiment

Next, an IC card 1b according to a third embodiment will be described with reference to the drawings. This embodiment is an embodiment representing a modification of the second embodiment above. In the second embodiment, an example has been described in which authentication processing is performed using an authentication PIN that is changed every time authentication processing is performed successfully, and is stored as a stored PIN in the EEPROM 8a. In contrast, in this embodiment, an example will be described in which authentication processing is performed using an authentication PIN generated based on counter information and an authentication PIN initial value every time. Note that the hardware configuration of the IC card 1b according to this embodiment is similar to that of the first embodiment shown in FIG. 1, and thus its description is omitted here.

Figure 12:
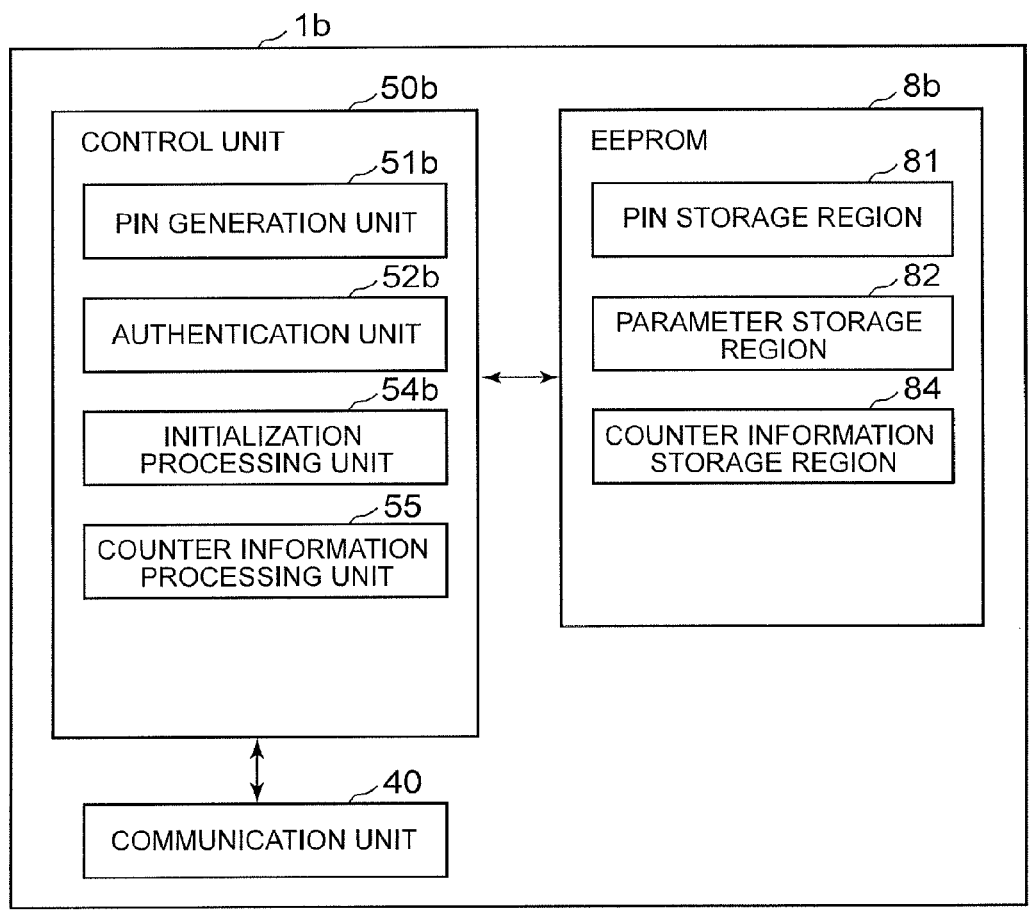
FIG. 12 is a block diagram showing an example of the functional configuration of an IC card of a third embodiment.

FIG. 12 is a block diagram showing an example of the functional configuration of the IC card 1b of this embodiment. As shown in this FIG. 12, the IC card 1b is provided with an EEPROM 8b, a communication unit 40 and a control unit 50b. The EEPROM 8b is provided with a PIN storage region 81, a parameter storage region 82 and a counter information storage region 84. Also, the control unit 50b is provided with a PIN generation unit 51b, an authentication unit 52b, an initialization processing unit 54b and a counter information processing unit 55. Here, the constituent elements shown in FIG. 12 are realized by using the hardware items shown in FIG. 1. Note that in this figure, the same reference numerals are assigned to the same constituent elements as the functional configurations shown in FIGS. 2 and 9, and its description is omitted.

The EEPROM 8b of this embodiment is not provided with a PIN initial value storage region 83, but instead, the PIN storage region 81 stores the initial value of the authentication PIN. The authentication unit 52b executes first authentication processing and second authentication processing. The PIN generation unit 51b compares, in the first authentication processing, an acquired PIN and the authentication PIN generated by the PIN generation unit 51b every time, and determines the validity of the card holder based on the comparison result. Also, the PIN generation unit 51b compares, in the second authentication processing, an acquired initial PIN (fourth password) acquired from the external apparatus 2 and the initial value of the authentication PIN stored in the PIN storage region 81, and determines the validity of card holder based on the comparison result.

The PIN generation unit 51b generates an authentication PIN based on the initial value of the authentication PIN stored in the PIN storage region 81, a predetermined parameter (e.g., an addition value) stored in the parameter storage region 82, predetermined calculation processing (e.g., addition processing) and counter information stored in the counter information storage region 84. In addition, if the authentication unit 52b determines based on the first authentication processing that the card holder is valid, the PIN generation unit 51b updates the counter information stored in the counter information storage region 84. Note that the PIN generation unit 51b generates an authentication PIN based on the initial value of the authentication PIN, the predetermined parameter (e.g., an addition value) and the counter information every time the authentication unit 52b executes the first authentication processing.

If the authentication unit 52b determines based on the first authentication processing that the card holder is valid, the initialization processing unit 54b initializes the counter information stored in the EEPROM 8b (the counter information storage region 84) in accordance with a counter information initialization request (counter information initialization command). Specifically, the initialization processing unit 54b causes "0", for example, to be stored as counter information stored in the counter information storage region 84.

Figure 13:
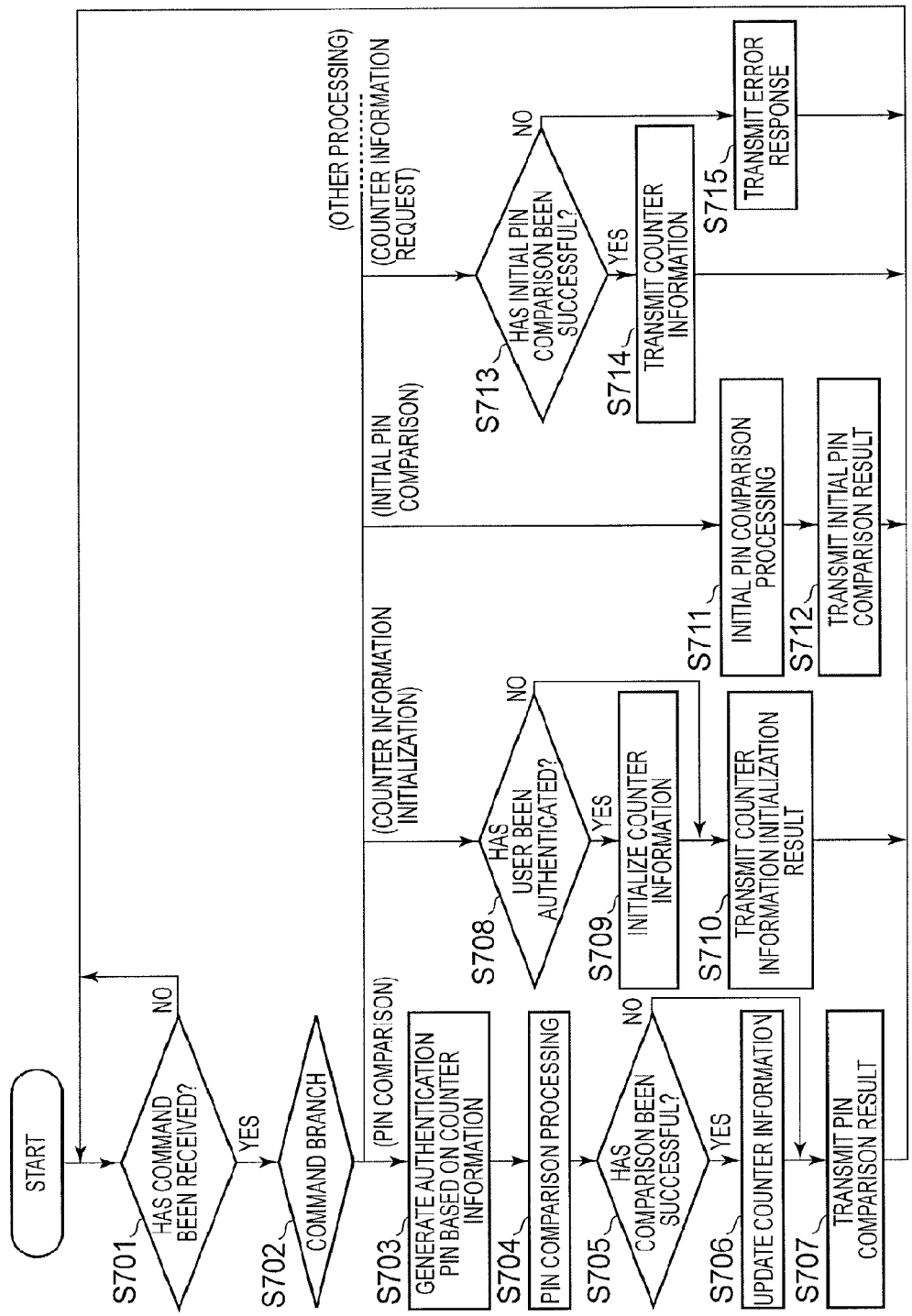
FIG. 13 is a flowchart showing an example of the operation of the IC card of the third embodiment.

Next, an example of operations of the IC card 1b according to this embodiment will be described with reference to FIG. 13. FIG. 13 is a flowchart showing an example of the operations of the IC card 1b of this embodiment. In this FIG.

13, the processing of steps S701 and S702 is similar to the processing of steps S501 and S502 shown in FIG. 10, and thus its description is omitted here.

Note that in the command branch processing in step S702, if the received command is a command to compare a PIN (PIN comparison), the control unit 50b advances the procedure to step S703. And if the received command is a counter information initialization request (counter information initialization), the control unit 50b advances the procedure to step S708. Moreover, if the received command is a command to compare a PIN initial value (initial PIN comparison), the control unit 50b advances the procedure to step S711. Additionally, if the received command is a command to request output of counter information (counter information request), the control unit 50b advances the procedure to step S713.

In step S703, the PIN generation unit 51b of the control unit 50b generates an authentication PIN based on counter information. For example, if a predetermined algorithm is addition processing and a predetermined parameter is an addition value, the PIN generation unit 51b generates an authentication PIN according to Expression 1 below.

$$\text{Authentication PIN} = \text{initial value of authentication PIN} + \text{addition value} \times \text{value of counter information} \quad (1)$$

Next, the authentication unit 52b of the control unit 50b compares an acquired PIN and the authentication PIN generated by the PIN generation unit 51b, as the first authentication processing (step S704). Next, the authentication unit 52b of the control unit 50b determines whether or not the comparison result indicates that comparison has been successful (step S705). If the comparison has been successful (step S705: YES), the authentication unit 52b stores, in the RAM 7, for example, information indicating that the comparison has been successful, and advances the procedure to step S706. And if the comparison has failed (step S705: NO), the authentication unit 52b advances the procedure to step S707. Note that, if the comparison has failed, the authentication unit 52b determines that the card holder is not valid. For example, if the card holder is not valid, the authentication unit 52b counts up error counter information (not illustrated) of the EEPROM 8b indicating the number of times authentication has failed, and furthermore, if the error counter information reaches a predetermined count value, execution of comparison processing using the authentication PIN may be forbidden.

In step S706, the PIN generation unit 51b updates the counter information stored in the counter information storage region 84. Specifically, the PIN generation unit 51b adds "1" to the value of the counter information stored in the counter information storage region 84, and stores the result in the counter information storage region 84 again. The processing of the next step S707 is similar to the processing of step S507 shown in FIG. 10, and thus its description is omitted here.

Also, the processing of steps S708 to S710 is similar to the processing of steps S508 to S511 shown in FIG. 10 excluding the processing of step S509, and thus its description is omitted here. Note that the initialization processing unit 54b of this embodiment does not need to perform authentication PIN initialization, and performs initialization of the counter information in step S709. Moreover, in step S710, the control unit 50b causes the communication unit 40 to transmit a result of initializing the counter information instead of a PIN initialization result.

Additionally, the processing of steps S711 to S715 is similar to the processing of steps S512 to S516 shown in FIG. 10, and thus its description is omitted here.

Figure 14:
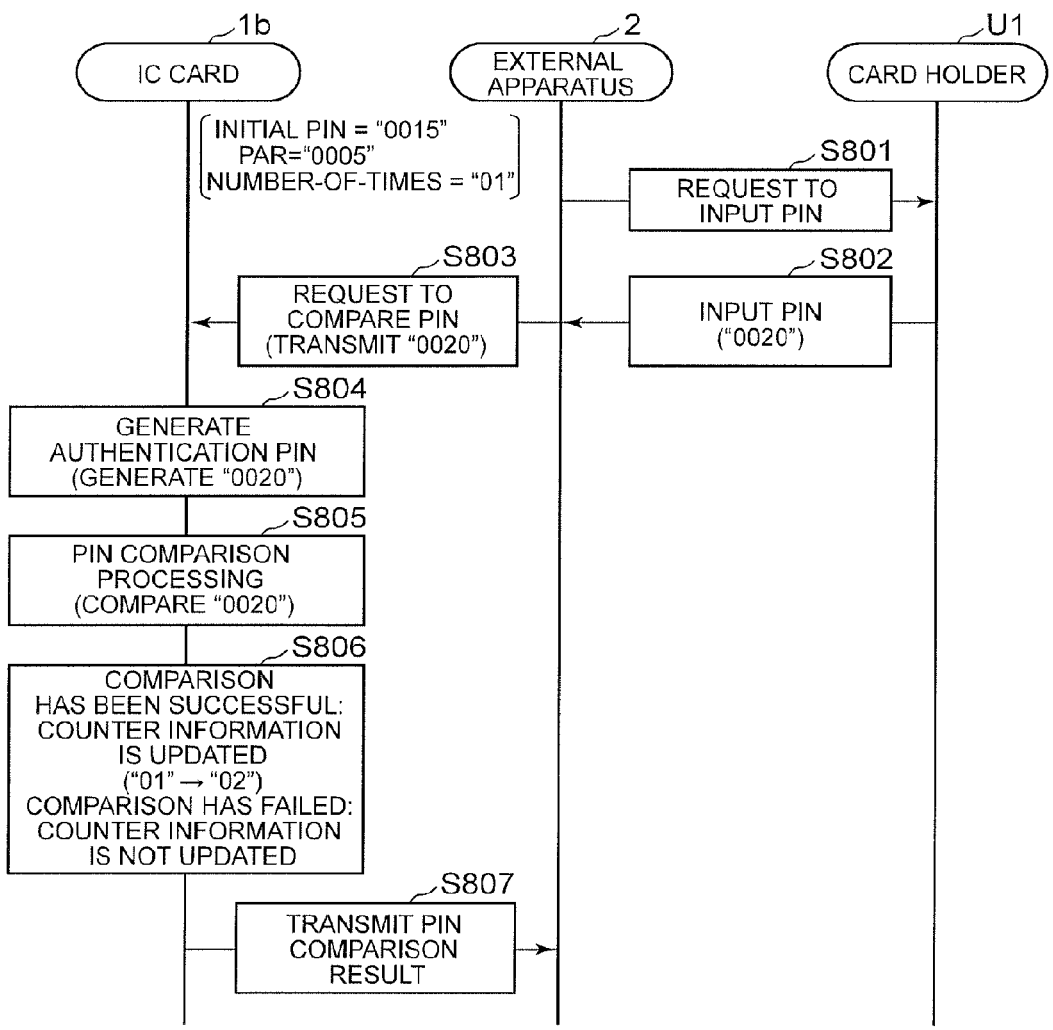
FIG. 14 is a diagram showing an example of authentication processing of the IC card of the third embodiment.

Next, authentication processing of the IC card 1b according to this embodiment will be described with reference to FIG. 14. FIG. 14 is a diagram showing an example of authentication processing of the IC card 1b of the embodiment. In this FIG. 14, the IC card 1b is in the state where the "initial PIN" (the initial value of the authentication PIN) is "0015", the "PAR" (addition value) is "0005" and the "number of times" (counter information) is "01", and an example will be described in which authentication processing is performed using this state as an initial state, in the example shown in this FIG. 14. Note that the predetermined algorithm here is addition processing.

In FIG. 14, if the card holder U1 specifies, in the external apparatus 2, transaction processing that uses the IC card 1b, and connects the IC card 1b to the external apparatus 2, the external apparatus 2 outputs a PIN input request to the card holder U1 (step S801). The external apparatus 2 outputs, to a menu screen of a display unit (not illustrated), for example, a display for prompting the card holder U1 to input the PIN.

Next, when the PIN (e.g., "0020") is input to the external apparatus 2 by the card holder U1 (step S802), the external apparatus 2 transmits a PIN comparison request to the IC card 1b (step S803). Specifically, the external apparatus 2 transmits a PIN comparison command that includes "0020" as an acquired PIN, for example, to the IC card 1b.

Next, the IC card 1b generates an authentication PIN in accordance with the PIN comparison command (step S804). Specifically, the PIN generation unit 51b generates an authentication PIN based on an authentication PIN initial value, a predetermined parameter (e.g., an addition value) and counter information. Here, the PIN generation unit 51b generates "0020" as the authentication PIN.

Next, the IC card 1b executes PIN comparison processing (e.g., comparison of "0020") (step S805). The authentication unit 52b of the IC card 1b compares the acquired PIN "0020" and the generated authentication PIN "0020", for example. Note that here, the acquired PIN "0020" and the generated authentication PIN "0020" match, and thus the authentication unit 52b determines that comparison has been successful.

Next, if the comparison has been successful, the PIN generation unit 51b of the IC card 1b updates the counter information, and if the comparison has failed, does not update the counter information (step S806). Note that in this example, the authentication unit 52b determines that comparison has been successful, and thus the PIN generation unit 51b changes the counter information from "01" to "02", and stores "02" in the counter information storage region 84.

Next, the IC card 1b transmits the PIN comparison result to the external apparatus 2 (step S807). Specifically, the control unit 50b of the IC card 1b causes the communication unit 40 to transmit the PIN comparison result of the authentication unit 52b.

As described above, in the IC card 1b according to this embodiment, the EEPROM 8b stores, as a stored PIN, the initial value of an authentication PIN, and stores counter information indicating the number of times an authentication PIN has been generated. The authentication unit 52b executes first authentication processing and second authentication processing. The authentication unit 52b compares, in the first authentication processing, an acquired PIN and the authentication PIN, and determines the validity of the card holder based on the comparison result. Also, the authentication unit 52b compares, in the second authentication processing, an acquired initial PIN acquired from the external apparatus 2 and the initial value of the authentication PIN, and determines the validity of the card holder based on the comparison result. The PIN generation unit 51*b* generates an authentication PIN based on the initial value of the authentication PIN, a predetermined parameter (e.g., an addition value), predetermined calculation processing (e.g., addition processing) and the counter information stored in the EEPROM 8*b*. In addition, if the authentication unit 52*b* determines based on the first authentication processing that the card holder is valid, the PIN generation unit 51*b* updates the counter information stored in the EEPROM 8*b*. Accordingly, the IC card 1*b* according to this embodiment changes the authentication PIN as dynamic data for every authentication processing, and thus can improve the security similarly to the first and second embodiments.

Moreover, in this embodiment, the IC card 1*b* is provided with the counter information processing unit 55 for outputting counter information to the external apparatus 2, if it is determined from the second authentication processing performed by the authentication unit 52*b* that the card holder is valid. Accordingly, in the IC card 1*b* according to this embodiment, similarly to the second embodiment, even if the card holder has forgotten the current authentication PIN, the card holder can independently generate an authentication PIN.

Moreover, in this embodiment, the IC card 1*b* is provided with the initialization processing unit 54*b* for initializing, in accordance with a counter information initialization request, counter information stored in the EEPROM 8*b* if it is determined from the first authentication processing performed by the authentication unit 52*b* that the card user is valid. Accordingly, in the IC card 1*b* according to this embodiment, the card holder can return the current authentication PIN to the initial value while ensuring security.

Fourth Embodiment

Next, an IC card 1*c* according to a fourth embodiment will be described with reference to the drawings. In this embodiment, an example will be described for a case where supply information supplied from an external apparatus 2 is used as a predetermined parameter for changing an authentication PIN. In addition, in this embodiment, an example will be described in which replacement processing is used as an example of a predetermined algorithm. Note that the hardware configuration of the IC card 1*c* according to this embodiment is similar to that of the first embodiment shown in FIG. 1, and thus its description is omitted here.

Figure 15:
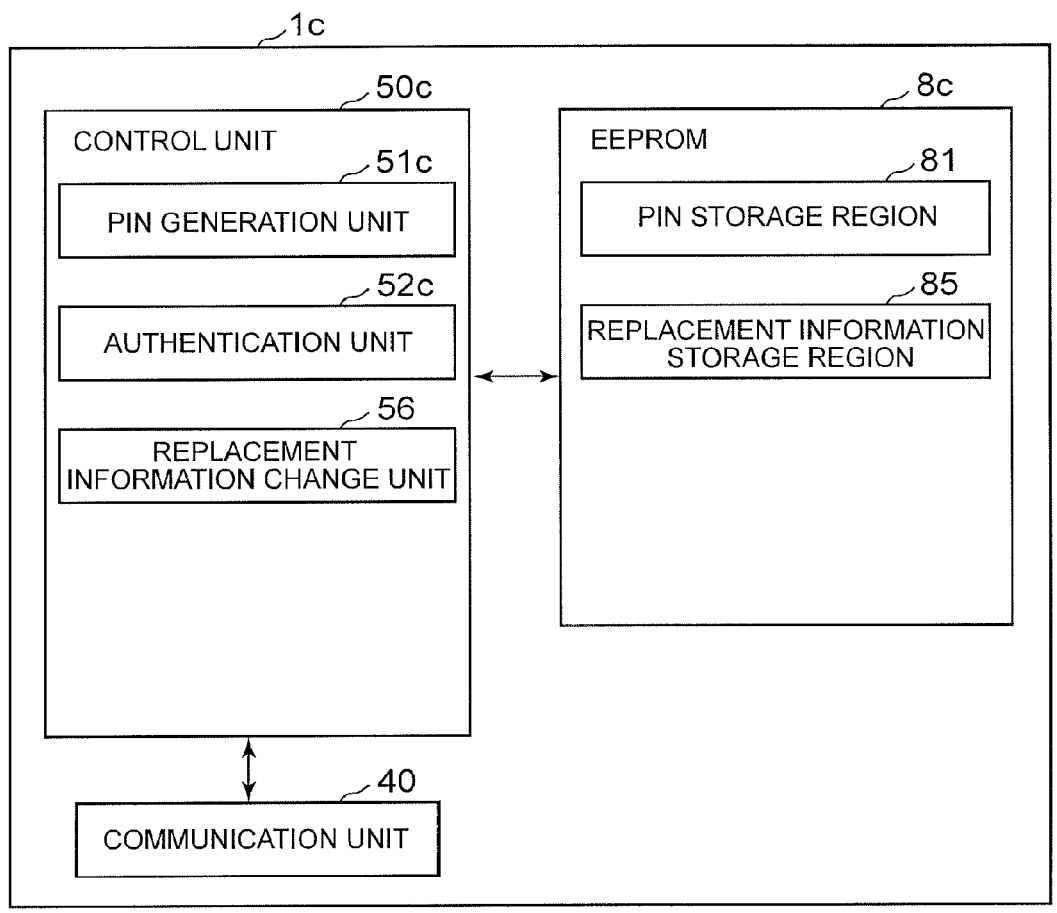
FIG. 15 is a block diagram showing an example of the functional configuration of an IC card of a fourth embodiment.

FIG. 15 is a block diagram showing an example of the functional configuration of the IC card 1*c* of this embodiment. As shown in this FIG. 15, the IC card 1*c* is provided with an EEPROM 8*c*, a communication unit 40 and a control unit 50*c*. The EEPROM 8*c* is provided with a PIN storage region 81 and a replacement information storage region 85. Also, the control unit 50*c* is provided with a PIN generation unit 51*c*, an authentication unit 52*c* and a replacement information change unit 56. Here, the constituent elements shown in FIG. 15 are realized by using the hardware items shown in FIG. 1.

The PIN storage region 81 stores the initial value of an authentication PIN similarly to the third embodiment above. The replacement information storage region 85 stores replacement processing information. Here, the replacement processing information indicates at least one of a predetermined position in the authentication PIN, a type of supply information and a method for generating a predetermined replacement value generated based on supply information. Moreover, the supply information is information supplied from the external apparatus 2 when performing a transaction of the IC card 1*c*, and types of supply information include a transaction date, a transaction time zone, a transaction day of the week and a transaction amount, for example.

The PIN generation unit 51*c* generates an authentication PIN using supply information supplied from the external apparatus 2 as a predetermined parameter, based on the supply information, a predetermined algorithm (e.g., replacement processing) and an authentication PIN initial value. For example, the PIN generation unit 51*c* replaces the last one digit of the authentication PIN initial value with the last one digit of a transaction date serving as the supply information, and generates an authentication PIN.

If the authentication unit 52*c* determines that the card user is valid, the replacement information change unit 56 (an example of a change unit) changes replacement processing information stored in the EEPROM 8*c* (the replacement information storage region 85) in accordance with a replacement processing information change request.

Figure 16:
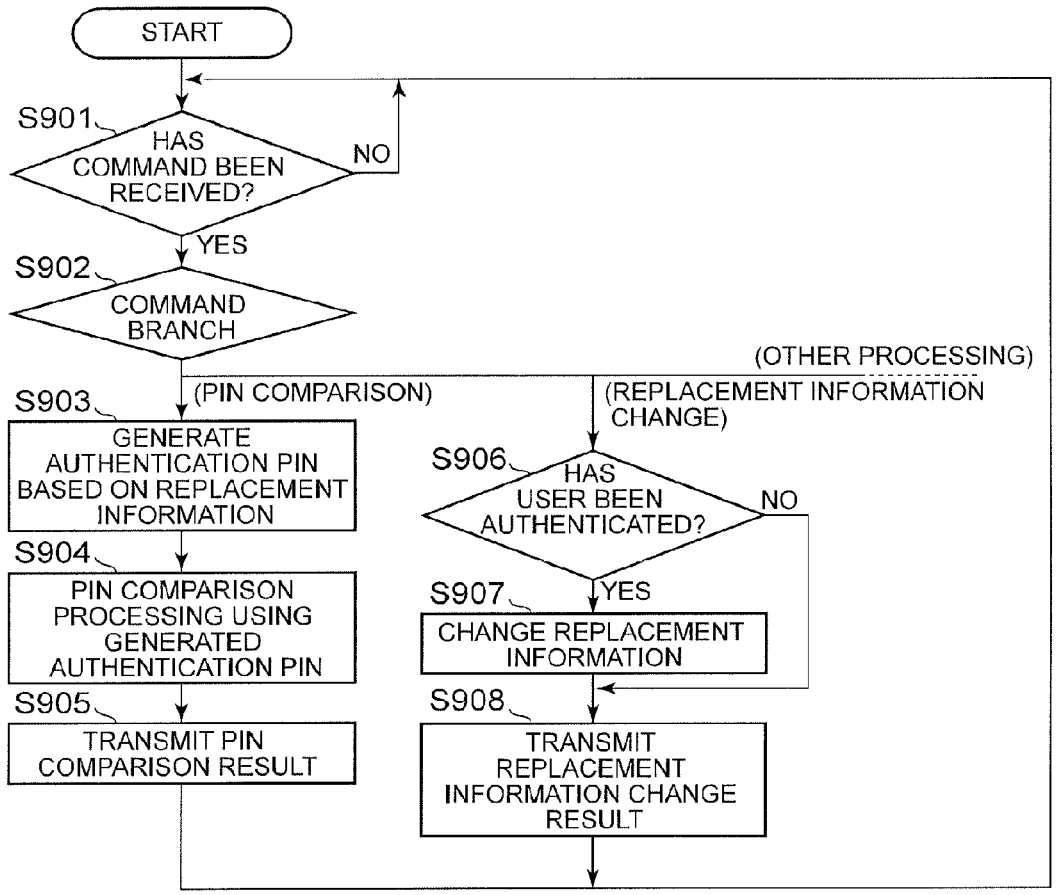
FIG. 16 is a flowchart showing an example of the operation of the IC card of the fourth embodiment.

Next, an example of operations of the IC card 1*c* according to this embodiment will be described with reference to FIG. 16. FIG. 16 is a flowchart showing an example of the operations of the IC card 1*c* of this embodiment. In this FIG. 16, the processing of steps S901 and S902 is similar to the processing of steps S101 and S102 shown in FIG. 5, and thus its description is omitted here.

Note that in the command branch processing of step S902, if the received command is a command to compare a PIN (PIN comparison), the control unit 50*c* advances the procedure to step S903. In addition, if the received command is a replacement processing information change request (replacement information change), the control unit 50*c* advances the procedure to step S906.

In step S902, the PIN generation unit 51*c* of the control unit 50*c* generates an authentication PIN based on replacement processing information. For example, the PIN generation unit 51*c* replaces the last one digit of the initial value of an authentication PIN with the last one digit of a transaction date serving as supply information, and generates an authentication PIN.

Next, the authentication unit 52*c* of the control unit 50*c* compares an acquired PIN and the authentication PIN generated by the PIN generation unit 51*c* (step S904). Next, the control unit 50*c* causes the PIN comparison result to be transmitted (step S905). Specifically, the control unit 50*c* causes the communication unit 40 to transmit the comparison result of the authentication unit 52*c* performing comparison (authentication result), as a response to the external apparatus 2. After the processing of step S904, the control unit 50*c* returns the procedure to step S901, and waits for the next command.

Moreover, in step S906, the replacement information change unit 56 of the control unit 50*c* determines whether or not the user has been authenticated (the card holder has been authenticated). The replacement information change unit 56 determines whether or not the card holder has been authenticated in accordance with whether or not information indicating that the comparison has been successful is stored in a RAM 7, for example. If the card holder has been authenticated (step S906: YES), the replacement information change unit 56 advances the procedure to step S907. In addition, if the card holder has not been authenticated (step S906: NO), the replacement information change unit 56 advances the procedure to step S908.

In step S907, the replacement information change unit 56 changes the replacement processing information stored in the replacement information storage region 85. Specifically, the parameter change unit 53 changes the replacement processing information stored in the replacement information storage region 85 to new replacement processing information acquired from the card holder via the external apparatus 2, for example. For example, if the replacement information change unit 56 acquires, from the card holder, a request to change the supply information from the transaction date to a transaction amount, the replacement information change unit 56 stores information for changing the supply information for generating an authentication PIN from the transaction date to a transaction amount, as replacement processing information in the replacement information storage region 85.

Moreover, in step S908, the control unit 50c causes the replacement information change result to be transmitted. Specifically, the control unit 50c causes the communication unit 40 to transmit the result (replacement information change result) of the replacement information change unit 56 changing the replacement processing information, as a response to the external apparatus 2. After the processing of step S908, the control unit 50c returns the procedure to step S901, and waits for the next command.

Figure 17:
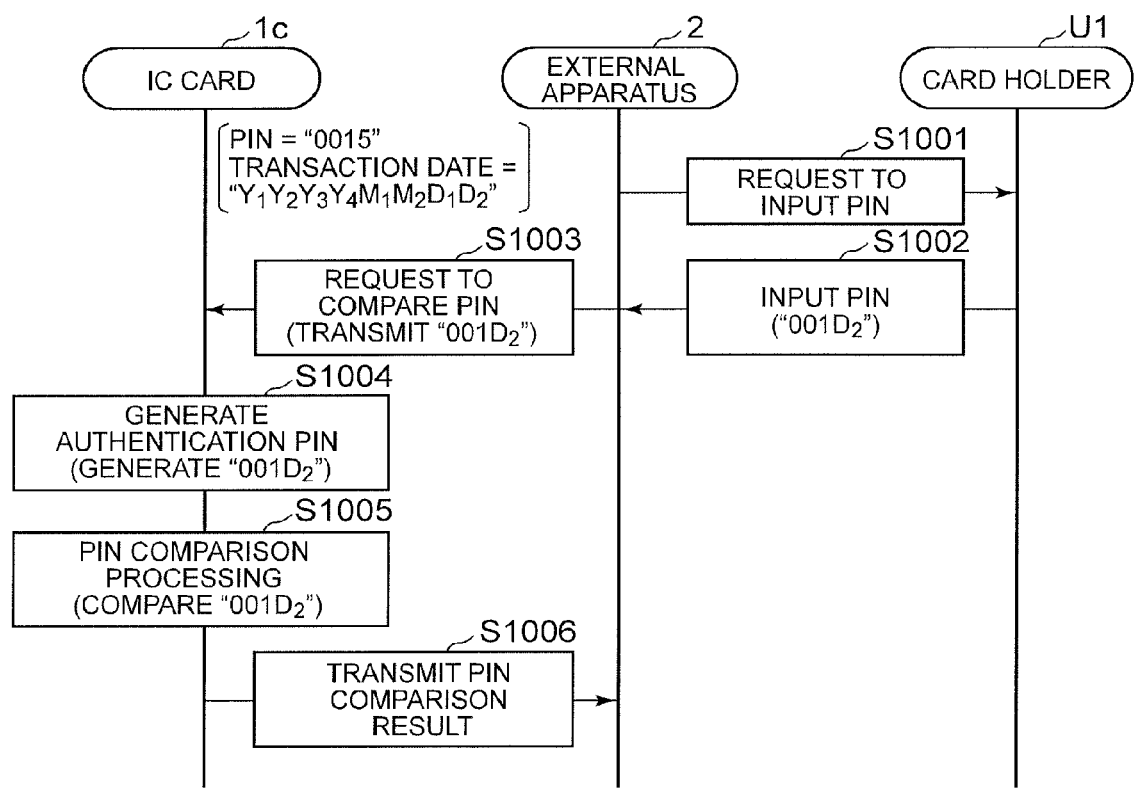
FIG. 17 is a diagram showing an example of authentication processing of the IC card of the fourth embodiment.

Next, authentication processing of the IC card 1c according to this embodiment will be described with reference to FIG. 17. FIG. 17 is a diagram showing an example of authentication processing of the IC card 1c of the embodiment. In this FIG. 17, the IC card 1c is in the state where the "PIN" (the initial value of an authentication PIN) is "0015", and supply information in which the "transaction date" is "$Y_1Y_2Y_3Y_4M_1M_2D_1D_2$" has been supplied already. In the example shown in this FIG. 17, an example will be described in which authentication processing is performed with this state serving as an initial state. Note that the predetermined algorithm here is replacement processing.

In FIG. 17, if the card holder U1 specifies, in the external apparatus 2, transaction processing that uses the IC card 1c, and connects the IC card 1c to the external apparatus 2, the external apparatus 2 outputs a PIN input request to the card holder U1 (step S1001). The external apparatus 2 outputs, to a menu screen of a display unit (not illustrated), a display for prompting the card holder U1 to input the PIN, for example.

The "transaction date" is "$Y_1Y_2Y_3Y_4M_1M_2D_1D_2$", and thus the card holder U1 replaces the last one digit of the PIN initial value with the last one digit "$D_2$" of this "transaction date", to generate an authentication PIN, for example. Specifically, when the PIN (e.g., "001$D_2$") is input to the external apparatus 2 by the card holder U1 (step S1002), the external apparatus 2 transmits a PIN comparison request to the IC card 1c (step S1003). Specifically, the external apparatus 2 transmits a PIN comparison command including "002$1D_2$" as an acquired PIN to the IC card 1c, for example.

Next, the IC card 1c generates an authentication PIN in accordance with the PIN comparison command (step S1004). Specifically, the PIN generation unit 51c generates an authentication PIN based on the initial value of the authentication PIN and the last one digit "$D_2$" of the "transaction date" that has been supplied already. Here, the PIN generation unit 51c performs processing for replacing the last one digit of the initial value of the authentication PIN with the last one digit "$D_2$" of the "transaction date", and generates "001$D_2$" as an authentication PIN.

Next, the IC card 1c executes PIN comparison processing (e.g., comparison of "001$D_2$") (step S1005). The authentication unit 52c of the IC card 1c compares the acquired PIN "001$D_2$" and the generated authentication PIN "001$D_2$", for example. Note that here, the acquired PIN "001$D_2$" and the generated authentication PIN "001$D_2$" match, and thus the authentication unit 52c determines that comparison has been successful.

Next, the IC card 1c transmits the PIN comparison result to the external apparatus 2 (step S1006). Specifically, the control unit 50c of the IC card 1c causes the communication unit 40 to transmit the PIN comparison result of the authentication unit 52c. In this manner, the IC card 1c according to this embodiment can change the authentication PIN in accordance with change in the supply information.

Note that in the above embodiment, an example has been described in which a transaction date is used as a predetermined parameter, but a transaction amount, a day of the week, a time (time zone) or the like may be used instead of a transaction date, for example. In addition, predetermined parameters may include information indicating a replacement position, a replacement value generation method, a type of supply information and the like. Moreover, if a day of the week or a time (time zone) is used as the predetermined parameter, the PIN generation unit 51c may determine a replacement value based on a correspondence table in which days of the week or time zones and replacement values are associated with each other. Moreover, the PIN generation unit 51c may determine a replacement value in accordance with the range of a transaction amount.

As described above, in the IC card 1c according to this embodiment, the predetermined parameter includes supply information supplied from the external apparatus 2, and the predetermined algorithm includes replacement processing for replacing the value at a predetermined position of a first password with a predetermined replacement value generated based on the supply information. The PIN generation unit 51c generates an authentication PIN based on this replacement processing. Accordingly, the IC card 1c according to this embodiment performs authentication processing with an authentication PIN serving as dynamic data, and thus can improve the security similarly to the first embodiment.

Moreover, in this embodiment, the EEPROM 8c stores replacement processing information indicating at least one of a predetermined position, a type of supply information and a predetermined replacement value generation method. The IC card 1c is further provided with the replacement information change unit 56 that changes the replacement processing information stored in the EEPROM 8c in accordance with a replacement processing information change request if the authentication unit 52c determines that the card user is valid. Accordingly, for example, the IC card 1c according to this embodiment can reduce the possibility that the authentication PIN generation algorithm is found by a third party, by periodically changing the replacement processing information. Therefore, the IC card 1c according to this embodiment can further improve the security.

Fifth Embodiment

Next, an IC card 1d according to a fifth embodiment will be described with reference to FIG. 18. In this embodiment, an example will be described for a case where the IC card 1d has a plurality of predetermined algorithms for generating (changing) an authentication PIN, selects one of the predetermined algorithms and uses it as an authentication PIN. Note that the hardware configuration of the IC card 1d according to this embodiment is similar to that of the first embodiment shown in FIG. 1, and thus its description is omitted here.

Figure 18:
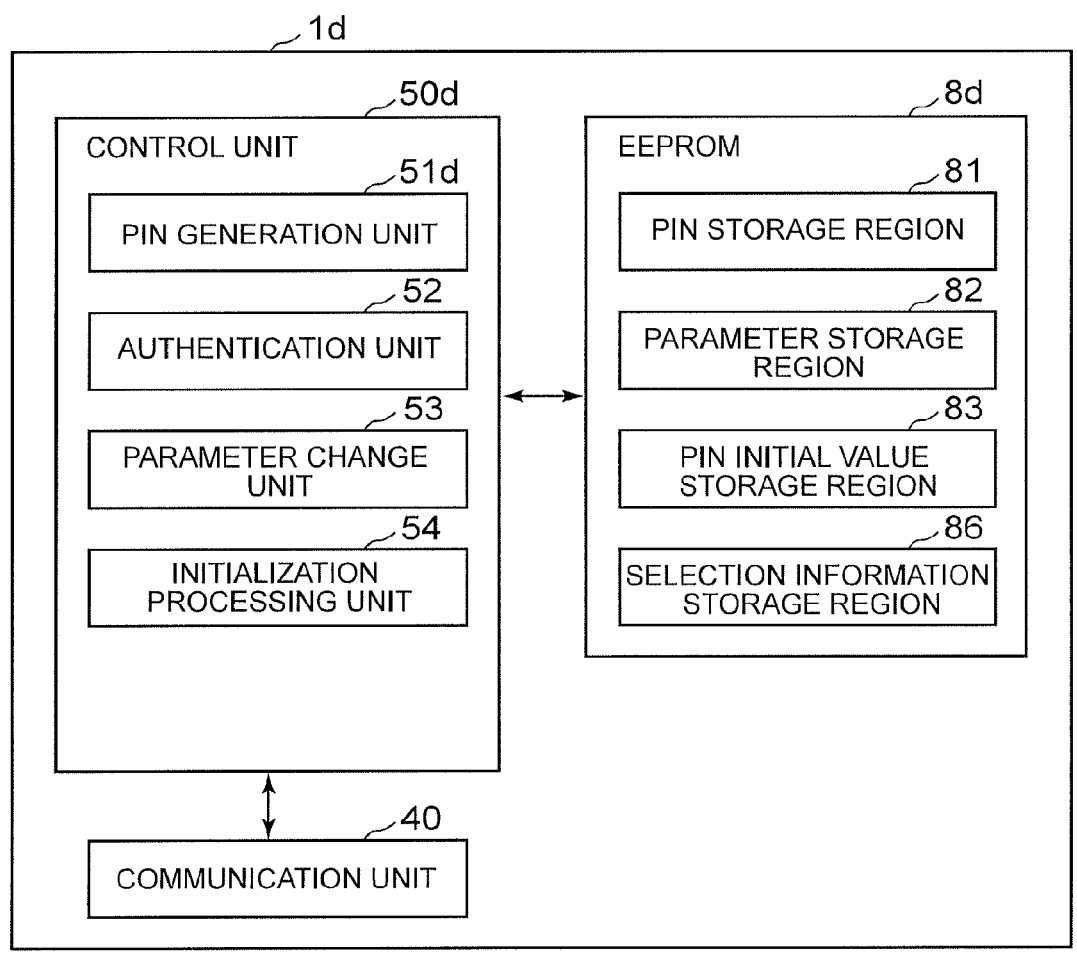
FIG. 18 is a block diagram showing an example of the functional configuration of an IC card of a fifth embodiment.

FIG. 18 is a block diagram showing an example of the functional configuration of the IC card 1d of this embodiment. As shown in this FIG. 18, the IC card 1d is provided with an EEPROM 8d, a communication unit 40 and a control unit 50d. The EEPROM 8d is provided with a PIN storage region 81, a parameter storage region 82, a PIN initial value storage region 83 and a selection information storage region 86. Also, the control unit 50d is provided with a PIN generation unit 51d, an authentication unit 52, a parameter change unit 53 and an initialization processing unit 54. Here, the constituent elements shown in FIG. 18 are realized by using the hardware items shown in FIG. 1. In addition, in this figure, the same reference numerals are assigned to the same constituent elements as the functional configuration shown in FIG. 2, and its description is omitted.

The selection information storage region 86 stores selection information for selecting one of a plurality of predetermined algorithms of different types. For example, the selection information storage region 86 stores "01" if the predetermined algorithm is addition processing, stores "02" if the predetermined algorithm is subtraction processing, and stores "03" if the predetermined algorithm is replacement processing. Note that the parameter storage region 82 of this embodiment stores parameters respectively corresponding to the plurality of predetermined algorithms.

The PIN generation unit 51d performs selection based on the selection information stored in the EEPROM 8c1 (the selection information storage region 86), and generates an authentication PIN based on the selected predetermined algorithm. For example, if the selection information stored in the selection information storage region 86 is "01", addition processing is selected as the predetermined algorithm, and an authentication PIN is generated based on addition processing.

As described above, in the IC card 1d according to this embodiment, the EEPROM 8d stores selection information for selecting one of a plurality of predetermined algorithms of different types. The PIN generation unit 51d then selects one of the predetermined algorithms based on the selection information stored in the EEPROM 8d, and generates an authentication PIN based on the selected predetermined algorithm. Accordingly, it is possible to select an algorithm for generating an authentication PIN from the plurality of predetermined algorithms, and thus the IC card 1d according to this embodiment can reduce the possibility that the authentication PIN generation algorithm is found by a third party. Therefore, the IC card 1d according to this embodiment can further improve the security.

Note that in this embodiment, the IC card 1d may be provided with a change unit for changing the selection information stored in the EEPROM 8d in accordance with an algorithm change request (e.g., an algorithm change command) if the authentication unit 52 determines that the card holder is valid. Accordingly, the predetermined algorithm can be changed periodically, and thus the IC card 1d according to this embodiment can further improve the security.

In the embodiments above, an example has been described for a case where each of the embodiments is implemented in an isolated manner, but the embodiments may be implemented in combination. Moreover, in the embodiments above, the IC card 1 (1a to 1d) is configured to be provided with the EEPROM 8 (8a to 8d) as a rewritable non-volatile memory, but there is no limitation thereto. For example, the IC card 1 (1a) may be provided with a flash EEPROM, a FeRAM (Ferroelectric Random Access Memory) or the like instead of the EEPROM 8 (8a to 8c1).

In addition, in the embodiments above, an example has been described in which the IC card 1 (1a to 1d) performs communication with the external apparatus 2 via the contact portion 3, but the IC card 1 may be configured to perform communication with the external apparatus 2 via a contactless interface in which a coil or the like is used.

According to at least one embodiment above, the security can be improved by providing the PIN generation unit 51 (51a to 51d) for generating an authentication PIN of the card holder based on a stored PIN stored in the EEPROM 8 (8a to 8d) in advance, a predetermined parameter and a predetermined algorithm, and the authentication unit 52 (52a to 52c) for comparing an acquired PIN acquired from the external apparatus 2 and the authentication PIN, and determining the validity of the card holder based on the comparison result.

Note that processing in the constituent elements of the above-described the IC card 1 (1a to 1d) and the authentication center apparatus 200 may be performed by recording, in a computer-readable recording medium, a program for realizing the function of each of the constituent elements of the IC card 1 (1a to 1d) and the authentication center apparatus 200 in the embodiments, loading, to a computer system, the program recorded in this recording medium, and executing the program. Here, "loading, to a computer system, the program recorded in this recording medium, and executing the program" includes installing the program in the computer system. The "computer system" here is assumed to include an OS and hardware such as a peripheral apparatus. Also, the "computer system" may include a plurality of computer apparatuses connected via the Internet, a WAN, a LAN, or a network including a communication line such as a dedicated line. Moreover, the "computer-readable recording medium" refers to a flexible disk, a magneto optical disk, a ROM, a portable medium such as a CD-ROM, or a storage apparatus such as a hard disk built in the computer system. As described above, the recording medium that stores a program may be a non-transient recording medium such as a CD-ROM.

Moreover, the recording medium also includes a recording medium that is accessible from a distribution server to distribute the program and is provided internally or externally. Note that a configuration may be adopted in which a program is divided into a plurality of pieces, which are downloaded at different timings and are then combined in each of the constituent elements of the IC card 1 (1a to 1d) and the authentication center apparatus 200, and different distribution servers may respectively distribute the divided pieces of the program. Furthermore, the "computer-readable recording medium" also includes a computer-readable recording medium that holds a program for a certain period of time, such as a volatile memory (RAM) in the computer system serving as a server or a client if the program is transmitted via a network. Also, the above program may be a program for realizing a portion of the above-described functions. Furthermore, the above program may be a program that can realize the above-described functions if combined with a program that has been already recorded in the computer system, or maybe a so-called differential file (differential program).

It should be noted that even though several embodiments of the invention have been explained, these embodiments are merely exemplary and are not meant to limit the scope of the invention. These embodiments can be embodied in various forms, and various eliminations, replacements and other changes are possible, without departing from the invention. Also these other embodiments and modifications are to be included within the scope of the invention, and are included within the scope stated in the claims and equivalents thereof.

LIST OF REFERENCE NUMERALS 1, 1a, 1b, 1c, 1d . . . IC card, 2 . . . External apparatus, 3 . . . Contact portion, 4 . . . Communication I/F unit, 5 . . . CPU, 6 . . . ROM, 7 . . . RAM, 8, 8a, 8b, 8c, 8d . . . EEPROM, 10 . . . IC chip, 20 . . . IC card system, 40 . . . Communication unit, 50, 50a, 50b, 50c, 50c1 . . . Control unit, 51, 51a, 50b, 51c, 51d, 231 . . . PIN generation unit, 52, 52a, 52b, 52c . . . Authentication unit, 53, 233 . . . Parameter change unit, 54, 54a, 54b, 234 . . . Initialization processing unit, 55 . . . Counter information processing unit, 56 . . . Replacement information change unit, 81 . . . PIN storage region, 82 . . . Parameter storage region, 83 . . . PIN initial value storage region, 84 . . . Counter information storage region, 85 . . . Replacement information storage region, 86 . . . Selection information storage region, 100 . . . IC module, 200 . . . Authentication center apparatus, 210 . . . Center communication unit, 220 . . . Center storage unit, 221 . . . Card information storage unit, 230 . . . Center control unit, 232 . . . Center authentication unit, 235 . . . Synchronization processing unit, NW . . . Network, U1 . . . Card holder

The invention claimed is:

1. An IC card comprising:
a storage unit configured to store a first password;
a generation unit configured to generate a second password that is a password for authenticating a card user, based on the first password stored in the storage unit in advance, a predetermined parameter and a predetermined algorithm;
an authentication unit configured to compare a third password acquired from an external apparatus and the second password, and to determine validity of the card user based on a result of the comparison; and
a change unit configured to store, in the storage unit, the second password generated by the generation unit if the authentication unit determines that the card user is valid.

2. The IC card according to claim 1,
wherein the predetermined algorithm includes a calculation involving the first password and the predetermined parameter, and
the generation unit is configured to generate the second password by performing the calculation on the first password and the predetermined parameter.

3. The IC card according to claim 2,
wherein the storage unit stores the predetermined parameter in advance, and
the IC card further comprises a change unit configured to change the predetermined parameter stored in the storage unit in response to a request to change the predetermined parameter, if the authentication unit has determined that the card user is valid.

4. The IC card according to claim 2,
wherein the storage unit stores an initial value of the second password as the first password, and stores counter information indicating the number of times the second password has been generated,
the authentication unit is configured to execute:
first authentication processing for comparing the third password and the second password, and determining the validity of the card user based on a result of the comparison; and
second authentication processing for comparing a fourth password acquired from the external apparatus and the initial value of the second password, and determining the validity of the card user based on a result of the comparison, and
the generation unit is configured to generate the second password based on the initial value of the second password, the predetermined parameter, the calculation and the counter information stored in the storage unit, and if it is determined from the first authentication processing performed by the authentication unit that the card user is valid, updates the counter information stored in the storage unit.

5. The IC card according to claim 4 comprising:
a counter information processing unit configured to output the counter information to the external apparatus, if it has been determined from the second authentication processing performed by the authentication unit that the card user is valid; and
an initialization processing unit configured to initialize the counter info' ration stored in the storage unit in response to a request to initialize the counter information, if it is determined from the first authentication processing performed by the authentication unit that the card user is valid.

6. The IC card according to claim 1,
wherein the storage unit stores an initial value of the second password, and
the IC card further comprises an initialization processing unit configured to change the first password stored in the storage unit to the initial value of the second password in response to a request to initialize the second password, if the authentication unit has determined that the card user is valid.

7. The IC card according to claim 1,
wherein the storage unit stores an initial value of the second password and counter information indicating the number of times the second password has been generated,
the authentication unit executes:
first authentication processing for comparing the third password and the second password, and determining the validity of the card user based on a result of the comparison; and
second authentication processing for comparing a fourth password acquired from the external apparatus and the initial value of the second password, and determining the validity of the card user based on a result of the comparison,
if the authentication unit has determined from the first authentication processing that the card user is valid, the generation unit generates the second password, and updates the counter information stored in the storage unit, and
the IC card further comprises a counter information processing unit configured to output the counter information to the external apparatus, if the authentication unit has determined from the second authentication processing that the card user is valid.

8. The IC card according to claim 7 comprising:
an initialization processing unit configured to change the first password stored in the storage unit to the initial value of the second password, and initialize the counter information stored in the storage unit, in response to a request to initialize the second password, if the authentication unit has determined from the first authentication processing that the card user is valid.

9. The IC card according to claim 1,
wherein the predetermined parameter includes supply information supplied from the external apparatus,
the predetermined algorithm includes replacement processing for replacing a value at a predetermined position of the first password with a predetermined replacement value generated based on the supply information, and
the generation unit generates the second password based on the replacement processing.

10. The IC card according to claim 9,
wherein the storage unit stores replacement processing information indicating at least one of the predetermined position, a type of the supply information and a method for generating the predetermined replacement value, and
the change unit further comprises a change unit configured to change the replacement processing information stored in the storage unit in response to a request to change the replacement processing information, if the authentication unit has determined that the card user is valid.

11. The IC card according to claim 1,
wherein the storage unit stores selection information for selecting one of a plurality of predetermined algorithms of different types, and
the generation unit is configured to select one of the plurality of predetermined algorithms based on the selection information stored in the storage unit, and to generate the second password based on the selected predetermined algorithm.

12. An IC card system comprising;
the IC card according to claim 1; and
an authentication center apparatus that is connected to the IC card via the external apparatus,
wherein the authentication center apparatus has:
a center storage unit that stores card identification information for identifying the IC card, the first password and the predetermined parameter in association with each other;
a center generation unit configured to generate the second password based on the first password, the predetermined parameter stored in the center storage unit and the predetermined algorithm,
a center authentication unit configured to compare the third password acquired from the card user via the external apparatus and the second password, and to determine the validity of the card user based on a result of the comparison; and
a synchronization processing unit configured to change the first password and the predetermined parameter stored in the center storage unit to the first password and the predetermined parameter stored in the IC card if the first password and the predetermined parameter stored in the IC card do not match the first password and the predetermined parameter stored in the center storage unit in association with the card identification information corresponding to the IC card.

13. An IC module comprising:
a storage unit configured to store a first password;
a generation unit configured to generate a second password that is a password for authenticating a card user, based on the first password stored in the storage unit in advance, a predetermined parameter and a predetermined algorithm, wherein the storage unit stores an initial value of the second password;
an initialization processing unit configured to change the first password stored in the storage unit to the initial value of the second password in response to a request to initialize the second password, if an authentication unit has determined that the card user is valid; and
the authentication unit configured to compare a third password acquired from an external apparatus and the second password, and to determine validity of the card user based on a result of the comparison.

* * * * *